US012772149B2

(12) United States Patent
Horiuchi et al.

(10) Patent No.: US 12,772,149 B2

(45) **Date of Patent: *Oct. 20, 2026**

(54) COMMUNICATION APPARATUS AND METHOD FOR SEARCH SPACE SETTINGS AND MONITORING

(71) Applicant: Panasonic Intellectual Property Corporation of America, Torrance, CA (US)

(72) Inventors: Ayako Horiuchi, Kanagawa (JP); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/886,766

(22) Filed: Sep. 16, 2024

(65) Prior Publication Data

US 2025/0008417 A1 Jan. 2, 2025

Related U.S. Application Data

(63) Continuation of application No. 17/559,788, filed on Dec. 22, 2021, now Pat. No. 12,127,100, which is a (Continued)

(30) Foreign Application Priority Data

Jun. 16, 2017 (JP) ................................ 2017-118607
Aug. 8, 2017 (JP) ................................ 2017-153346

(51) Int. Cl.
*H04W 48/12* (2009.01)
*H04W 72/0446* (2023.01)
(Continued)

(52) U.S. Cl.
CPC ....... *H04W 48/12* (2013.01); *H04W 72/0446* (2013.01); *H04W 72/23* (2023.01); *H04W 72/51* (2023.01)

(58) Field of Classification Search
CPC .............. H04W 48/12; H04W 72/042; H04W 72/0446; H04W 72/048; H04W 72/232;
(Continued)

(56) References Cited

U.S. PATENT DOCUMENTS 10,448,389 B1 10/2019 Seo et al.
10,524,244 B2 12/2019 Tsai et al.
(Continued)

FOREIGN PATENT DOCUMENTS

CN 102932090 A 2/2013
CN 106788931 A 5/2017
(Continued)

OTHER PUBLICATIONS

Intel Corporation, "Consideration on Blind Decoding for NR PDCCH", R1-1707382, 3GPP TSG RAN WG1 Meeting #89, Agenda item 7.1.3.1.2, Hangzhou, P.R. China, May 15-19, 2017, 5 pages. (Year: 2017).*

(Continued)

*Primary Examiner* — Angelica Perez

(74) *Attorney, Agent, or Firm* — Seed Intellectual Property Law Group LLP

(57) ABSTRACT

A communication apparatus includes circuitry and a transmitter. The circuitry sets a number of physical downlink control channel (PDCCH) candidates per aggregation level in a search space of a signal, and indicates the set number of PDCCH candidates to a user equipment (UE) wherein the search space is monitored by the UE based on the set number of PDCCH candidates. The transmitter transmit the signal. A maximum number of monitored PDCCH candidates per slot
(Continued)

depends on a subcarrier interval. A first subcarrier interval is one-quarter as wide as a second subcarrier interval, and a first maximum number of monitored PDCCH candidates per slot with the first subcarrier interval is not four times as high as a second maximum number of monitored PDCCH candidates per slot with the second subcarrier interval.

9 Claims, 16 Drawing Sheets

Related U.S. Application Data continuation of application No. 16/615,805, filed as application No. PCT/JP2018/015793 on Apr. 17, 2018, now Pat. No. 11,240,738.

(51) Int. Cl.
*H04W 72/23* (2023.01)
*H04W 72/51* (2023.01)

(58) Field of Classification Search
CPC ..... H04W 72/23; H04W 72/51; H04W 72/04; H04L 5/0053; H04L 5/0094; H04L 1/0036; H04L 5/0064; H04L 5/0023; H04L 5/001
See application file for complete search history.

(56) References Cited

U.S. PATENT DOCUMENTS

| | | | | |
|---|---|---|---|---|
| 10,524,284 | B2 | 12/2019 | Bagheri et al. | |
| 10,959,219 | B2 | 3/2021 | Jo et al. | |
| 10,979,265 | B2 | 4/2021 | Yi et al. | |
| 11,240,738 | B2 | 2/2022 | Horiuchi et al. | |
| 12,127,100 | B2 * | 10/2024 | Horiuchi | H04W 48/12 |
| 2014/0098775 | A1 | 4/2014 | Horiuchi et al. | |
| 2014/0146775 | A1 | 5/2014 | Guan et al. | |
| 2014/0254420 | A1 | 9/2014 | Kim et al. | |
| 2017/0094547 | A1 | 3/2017 | Yum et al. | |
| 2017/0099653 | A1 * | 4/2017 | Yoo | H04L 5/0053 |
| 2017/0367046 | A1 | 12/2017 | Papasakellariou | |
| 2018/0097678 | A1 | 4/2018 | Zhou et al. | |
| 2018/0324789 | A1 * | 11/2018 | Park | H04L 5/0044 |
| 2020/0220691 | A1 | 7/2020 | Gao et al. | |
| 2021/0084629 | A1 * | 3/2021 | Takeda | H04L 5/0091 |
| 2021/0345317 | A1 | 11/2021 | Hosseini et al. | |

FOREIGN PATENT DOCUMENTS

| | | | |
|---|---|---|---|
| JP | 2014527348 | A | 10/2014 |
| JP | 2015501595 | A | 1/2015 |
| JP | 2016029832 | A | 3/2016 |
| WO | WO 2013020505 | A1 | 2/2013 |
| WO | WO 2013024569 | A1 | 2/2013 |
| WO | WO 2017035305 | A1 | 3/2017 |

OTHER PUBLICATIONS

3GPP, "3rd Generation Partnership Project, Technical Specification Group Radio Access Network, NR, Physical layer procedures for control (Release 15)," 3GPP TS 38.213 V15. 1.0, Mar. 2018. (77 pages).

3GPP, "3rd Generation Partnership Project, Technical Specification Group Radio Access Network, NR, Physical layer procedures for control (Release 15)," 3GPP TS 38.213 V15.0.1, Mar. 2018. (94 pages).

CATT, "Design of sPDCCH search space," R1-1707432, Agenda Item: 6.2.1.2.2.3, 3GPP TSG RANWG1 Meeting #89, Hangzhou, P.R. China, May 15-19, 2017. (3 pages).

Ericsson, "On Control Resource Sets and Search Spaces," R1-1703287, Agenda Item: 8.1.3.1.4, 3GPP TSG-RANWG1 #88, Athens, Greece, Feb. 13-17, 2017. (3 pages).

Ericsson, "On Mixed Numerology," RI-1709094, Agenda Item: 7.1.3.3.1, 3GPP TSG-RAN WG1 #89, Hangzhou, China, May 15-19, 2017. (3 pages).

Extended European Search Report, dated May 12, 2020, for European Patent Application No. 18816885.0. (11 pages).

Intel Corporation, "Consideration on Blind Decoding for NR PDCCH", R1-1707382, 3GPP TSG RAN WG1 Meeting #89, Agenda item 7.1.3.1.2, Hangzhou, P.R. China, May 15-19, 2017. (5 pages).

Intel Corporation, "Considerations on blind decoding for NR PDCCH", R1-1707382, Agenda Item 7.1.3.1.2, 3GPP TSG RAN WG1 Meeting #89, Hangzhou, P.R. China, May 15-19, 2017. (5 pages).

International Search Report, dated Jun. 5, 2018, for International Patent Application No. PCT/JP2018/015793. (10 pages).

LG Electronics et al., WF on the hierarchical search space structure, R1-1706850, Agenda Item: 8.1.3.1.4, 3GPP TSG RAN 1 #88bis, Spokane, USA, Apr. 3-7, 2017. (2 pages).

Nokia et al., "Summary of [91-LTE-10] Email discussion on candidate techniques for LTE URLLC," R1-1801864, Agenda Item: 6.2.7.2, 3GPP TSG RAN WG1 Meeting #92, Athens, Greece, Feb. 26-Mar. 2, 2017. (26 pages).

NTT DOCOMO, "Initial Views on DL control channel design," R1-1610058, Agenda item 8.1.7.1, 3GPP TSG RAN WG1 Meeting #86, Lisbon, Portugal, Oct. 10-14, 2016. (7 pages).

NTT DOCOMO, "Revision of SI: Study on New Radio Access Technology," RP-161596, revision of RP-161214, Agenda Item: 9.2.2, 3GPP TSG RAN Meeting #73, New Orleans, US, Sep. 19-22, 2016. (7 pages).

Panasonic, "Discussion on group common PDCCH," R1-1702764, Agenda Item: 8.1.3.1.2, 3GPP TSG RAN WG1 Meeting #88, Athens, Greece, Feb. 13-17, 2017. (5 pages).

Samsung, "CR to 38.213 capturing the NR ad-hoc 1801 and RAN1#92 meeting agreements," R1-1803554, 3GPP TSG-RAN1 Meeting #92, Athens, Greece, Feb. 26-Mar. 1, 2018. (1 page).

Lee et al., "LTE-Advanced in 3GPP Rel-13/14: An Evolution Toward 5G," *IEEE Communications Magazine—Communications Standards Supplement* 54(3):36-42, Mar. 2016.

Extended European Search Report, dated May 26, 2026 for the related European Patent Application No. 26158916.2. (12 pages).

Intel Corporation, "Minimum HARQ processing time and Number of HARQ processes", R1-1705034, Agenda item:8.1.3.3.3, 3GPP TSG RAN WG1 Meeting RAN1 #88bis, Spokane, WA, U.S.A. Apr. 3-7, 2017. (4 pages).

Samsung, "NR-PDCCH design for Short Monitoring Periods," R1-1707992, Agenda Item 7.1.3.1.2, 3GPP TSG RAN WG1 Meeting #89, Hangzhou, China, May 15-19, 2017. (4 pages).

ZTE, "PDCCH monitoring for slots and mini-slots", R1-1707162, Agenda Item: 7.1.3.1.2, 3GPP TSG RAN WG1 Meeting #89, Hangzhou, P.R. China, May 15-19, 2017. (4 pages).

Chinese Search Report, dated Jul. 16, 2026 for corresponding Chinese Patent Application No. 202311145922.7. (with English translation) (6 pages).

* cited by examiner

FIG. 8

| SUBCARRIER INTERVAL | NUMBER OF DETECTIONS IN SEARCH SPACE |
|---|---|
| 15 kHz | Y |
| 30 kHz | 1/2 Y |
| 60 kHz | 1/4 Y |
| 120 kHz | 1/8 Y |
| 240 kHz | 1/16 Y |
| $2^m$ * 15 kHz | $1/2^m$ Y |

FIG. 9

| SUBCARRIER INTERVAL | NUMBER OF DETECTIONS IN SEARCH SPACE |
|---|---|
| 15 kHz, 30 kHz, 60 kHz | Y |
| 120 kHz, 240 kHz | 1/2 Y |
| WIDER THAN 240 kHz | 1/4 Y |

FIG. 13A

| CORESET A (NUMBER OF SYMBOLS: 3) | | | |
|---|---|---|---|
| | Symbol #0 | Symbol #1 | Symbol #2 |
| AL1 | – | – | 4 |
| AL2 | – | – | 4 |
| AL4 | – | – | 4 |
| AL8 | – | – | 4 |
| Total | – | – | 16 |

FIG. 13B

| CORESET B (NUMBER OF SYMBOLS: 2) | | |
|---|---|---|
| | Symbol #0 | Symbol #1 |
| AL1 | – | 4 |
| AL2 | – | 6 |
| AL4 | – | 4 |
| AL8 | – | 2 |
| Total | – | 16 |

FIG. 13C

| CORESET C (NUMBER OF SYMBOLS: 1) | |
|---|---|
| | Symbol #0 |
| AL1 | 6 |
| AL2 | 6 |
| AL4 | 2 |
| AL8 | 2 |
| Total | 16 |

FIG. 14A

| CORESET D (NUMBER OF SYMBOLS: 1) | |
|---|---|
| | Symbol #0 |
| AL1 | 2 |
| AL2 | 2 |
| AL4 | 1 |
| AL8 | 1 |
| Total | 6 |

FIG. 14B

| CORESET E (NUMBER OF SYMBOLS: 1) | |
|---|---|
| | Symbol #0 |
| AL1 | 4 |
| AL2 | 4 |
| AL4 | 1 |
| AL8 | 1 |
| Total | 10 |

FIG. 16

| | | Symbol #0 | Symbol #1 | Symbol #2 |
|---|---|---|---|---|
| CORESET A with length 3 | AL1 | 2 | 2 | 2 |
| | AL2 | 2 | 3 | 6 |
| | AL4 | 1 | 2 | 4 |
| | AL8 | 0 | 1 | 4 |
| | Total | 5 | 8 | 16 |
| CORESET B with length 2 | AL1 | 2 | 2 | |
| | AL2 | 2 | 3 | |
| | AL4 | 1 | 2 | |
| | AL8 | 0 | 1 | |
| | Total | 5 | 8 | |
| CORESET C with length 1 | AL1 | 2 | | |
| | AL2 | 2 | | |
| | AL4 | 2 | | |
| | AL8 | 0 | | |
| | Total | 6 | | |
| Total | | 16 | 16 | 16 |

FIG. 17

| | Symbol #0 | Symbol #1 | Symbol #2 |
|---|---|---|---|
| AL1 | 8 | 4 (only symbol #1) | |
| AL2 | 6 | 4 (only symbol #0/#1)<br>4 (only symbol #1) | 4 (only symbol #0/#1/#2)<br>2 (only symbol #2) |
| AL4 | 2 | 2 (only symbol #0/#1)<br>2 (only symbol #1) | 4 (only symbol #0/#1/#2)<br>2 (only symbol #2) |
| AL8 | | | 4 (only symbol #0/#1/#2) |
| Total | 16 | 16 | 16 |

FIG. 18

| | Symbol #0 | Symbol #1 | Symbol #2 |
|---|---|---|---|
| AL1 | 6 | 6 | 6 |
| AL2 | 6 | 6 | 6 |
| AL4 | 2 | 2 | 2 |
| AL8 | 2 | 2 | 2 |
| Total | 16 | 16 | 16 |

COMMUNICATION APPARATUS AND METHOD FOR SEARCH SPACE SETTINGS AND MONITORING

TECHNICAL FIELD

The present invention relates to a base station, a terminal, and a communication method.

BACKGROUND ART

A communication system referred to as 5th generation mobile communication system (5G) has been discussed. In 5G, discussion has been made about flexible provision of functions for each of various use cases where an increase in communication traffic, an increase in the number of connected terminals, high reliability, low latency, and so forth are requested. Three representative use cases are enhanced mobile broadband (eMBB), large-scale communications/multiple connections (massive machine type communications (mMTC)), and ultra reliable and low latency communication (URLLC). The 3rd Generation Partnership Project (3GPP) as an international standardizing body has been discussing upgrading of communication systems in view of both of upgrading of LTE systems and New Radio Access Technology (RAT) (for example, see NPL 1).

CITATION LIST

Non Patent Literature

NPL 1: RP-161596, "Revision of SI: Study on New Radio Access Technology", NTT DOCOMO, September 2016
NPL 2: R1-1702764, "Discussion on group common PDCCH", Panasonic, February 2017

SUMMARY OF INVENTION

In New RAT, discussion has been made about setting plural control resource sets (hereinafter referred to as "CORESET") as a physical downlink control channel (PDCCH) region, in which a downlink control indicator (DCI) is arranged, for a terminal (user equipment (UE)). However, sufficient discussion has not been made about a method in which the UE monitors (blind decoding) a search space as a position of a candidate of a PDCCH region (hereinafter referred to as "NR-PDCCH candidate") in which the DCI is arranged in the CORESET and thereby detects the DCI.

One embodiment of the present disclosure facilitates providing a base station, a terminal, and a communication method in which UE may monitor a search space in a CORESET and may appropriately detect a DCI.

A base station according to one embodiment of the present disclosure includes: a circuit that sets at least one search space which includes plural control channel candidates to be targets of detection of a control signal in a terminal; and a transmitter that transmits the control signal which is mapped on any of the plural control channel candidates in the search space. The number of detections in the search space by the terminal is determined based on settings of the terminal.

A base station according to one embodiment of the present disclosure includes: a circuit that sets at least one search space which includes plural control channel candidates to be targets of detection of a control signal in a terminal; and a transmitter that transmits the control signal which is mapped on any of the plural control channel candidates in the search space. A maximum value of the number of detections in the search space by the terminal is set for each symbol in which the plural control channel candidates are arranged. The circuit sets the number of detections for each of the plural control channel candidates within the maximum value at a final symbol in symbols in which the control channel candidate is arranged.

A terminal according to one embodiment of the present disclosure includes: a receiver that receives a signal; and a circuit that detects at least one search space which includes plural control channel candidates to be targets of detection of a control signal in the terminal and identifies the control signal which is addressed to the own terminal from the signal. The number of detections in the search space by the terminal is determined based on settings of the terminal.

A terminal according to one embodiment of the present disclosure includes: a receiver that receives a signal; and a circuit that detects at least one search space which includes plural control channel candidates to be targets of detection of a control signal in the terminal and identifies the control signal which is addressed to the own terminal from the signal. A maximum value of the number of detections in the search space by the terminal is set for each symbol in which the plural control channel candidates are arranged. The number of detections for each of the plural control channel candidates is set within the maximum value at a final symbol in symbols in which the control channel candidate is arranged.

A communication method according to one embodiment of the present disclosure includes: setting at least one search space that includes plural control channel candidates to be targets of detection of a control signal in a terminal; and transmitting the control signal that is mapped on any of the plural control channel candidates in the search space. The number of detections in the search space by the terminal is determined based on settings of the terminal.

A communication method according to one embodiment of the present disclosure includes: setting at least one search space that includes plural control channel candidates to be targets of detection of a control signal in a terminal; and transmitting the control signal that is mapped on any of the plural control channel candidates in the search space. A maximum value of the number of detections in the search space by the terminal is set for each symbol in which the plural control channel candidates are arranged. The number of detections for each of the plural control channel candidates is set within the maximum value at a final symbol in symbols in which the control channel candidate is arranged.

A communication method according to one embodiment of the present disclosure includes: receiving a signal; and detecting at least one search space that includes plural control channel candidates to be targets of detection of a control signal in the terminal to identify the control signal that is addressed to the own terminal from the signal. The number of detections in the search space by the terminal is determined based on settings of the terminal.

A communication method according to one embodiment of the present disclosure includes: receiving a signal; and detecting at least one search space that includes plural control channel candidates to be targets of detection of a control signal in the terminal to identify the control signal that is addressed to the terminal from the signal. A maximum value of the number of detections in the search space by the terminal is set for each symbol in which the plural control channel candidates are arranged. The number of detections for each of the plural control channel candidates is set within the maximum value at a final symbol in symbols in which the control channel candidate is arranged.

It should be noted that general or specific embodiments may be implemented as a system, an apparatus, a method, an integrated circuit, a computer program, or a recording medium and may be implemented by any combination of systems, apparatuses, methods, integrated circuits, computer programs, and recording media.

According to one embodiment of the present disclosure, UE may monitor a search space in a CORESET and may appropriately detect a DCI.

Further benefits and effects in one embodiment of the present disclosure will become apparent from the specification and drawings. Such benefits and/or effects are individually provided by features described in some embodiments, the specification, and the drawings. However, all of them do not necessarily have to be provided in order to obtain one or more same features.

BRIEF DESCRIPTION OF DRAWINGS

FIG. 8 illustrates a setting example of the number of detections in the search space according to action example 1-1 of the first embodiment.

FIG. 9 illustrates another setting example of the number of detections in the search space according to action example 1-1 of the first embodiment.

FIG. 13A illustrates a setting example of the number of detections in the search space for a CORESET A according to action example 2-1 of the second embodiment.

FIG. 13B illustrates a setting example of the number of detections in the search space for a CORESET B according to action example 2-1 of the second embodiment.

FIG. 13C illustrates a setting example of the number of detections in the search space for a CORESET C according to action example 2-1 of the second embodiment.

FIG. 14A illustrates a setting example of the number of detections in the search space for a CORESET D according to action example 2-1 of the second embodiment.

FIG. 14B illustrates a setting example of the number of detections in the search space for a CORESET E according to action example 2-1 of the second embodiment.

FIG. 16 illustrates a setting example of the numbers of detections in the search spaces for CORESETs according to action example 2-2 of the second embodiment.

FIG. 17 illustrates another setting example of the numbers of detections in the search spaces for CORESETs according to action example 2-2 of the second embodiment.

FIG. 18 illustrates another setting example of the numbers of detections in the search spaces for CORESETs according to action example 2-2 of the second embodiment.

DESCRIPTION OF EMBODIMENTS

Embodiments of the present disclosure will hereinafter be described in detail with reference to drawings.

In the LTE or LTE-Advanced, as channels for carrying a downlink control signal (DCI), a PDCCH and an enhanced PDCCH (EPDCCH) are used. In one subframe, the number of symbols in which the PDCCH or EPDCCH is arranged is fixed. Particularly, in a case where setting is performed such that two EPDCCH PRB sets (which correspond to a CORESET in NR) are detected in the EPDCCH, the symbols of two EPDCCH PRB sets are present to the final symbol of the subframe. Thus, the times at which detection of a search space (also referred to as blind decoding) with respect to two EPDCCH PRB sets is started are the same.

Further, in the LTE or LTE-Advanced, the number of detections in the search space by UE is set in consideration of the time requested by UE to receive DL data (physical downlink shared channel (PDSCH)) and to transmit ACK/NACK (response signal). However, the number of detections in the search space is set to the same value per DCI format with respect to any UE.

Meanwhile, in NR, search space detection capability (number of detections) is considered to be different with respect of each piece of UE or each CORESET.

NR has a problem in that when the number of detections in the search space is uniformly determined as the PDCCH or EPDCCH in the LTE or LTE-Advanced, the search space detection capability may not be fully used depending on the UE, or the number of detections that is the search space detection capability of the UE or higher is set.

Accordingly, in the following, a method will be described in which the search space for each piece of UE or each CORESET is flexibly set and the UE monitors the search spaces of one or plural CORESETs to appropriately detect the DCI.

[Outline of Communication System]

A communication system according to each embodiment of the present disclosure includes a base station 100 (gNB) and a terminal 200 (UE).

Figure 1:
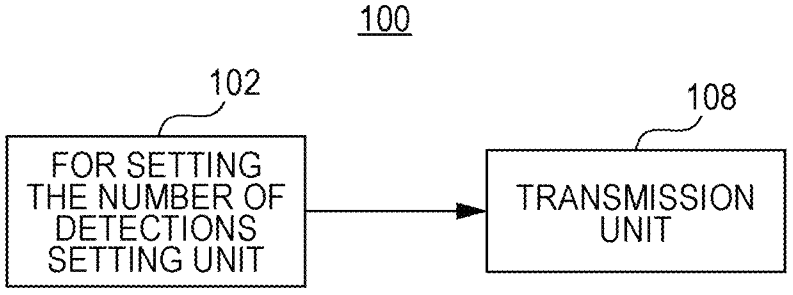
FIG. 1 illustrates a configuration of a portion of a base station according to a first embodiment.

FIG. 1 is a block diagram that illustrates a configuration of a portion of the base station 100 according to the embodiment of the present disclosure. In the base station 100 illustrated in FIG. 1, a setting unit 102 for setting the number of detections sets at least one search space that includes plural control channel candidates to be targets of detection of a control signal (DCI) in the terminal 200, and a transmission unit 108 transmits the control signal that is mapped on any of the plural control channel candidates in the search space.

Figure 2:
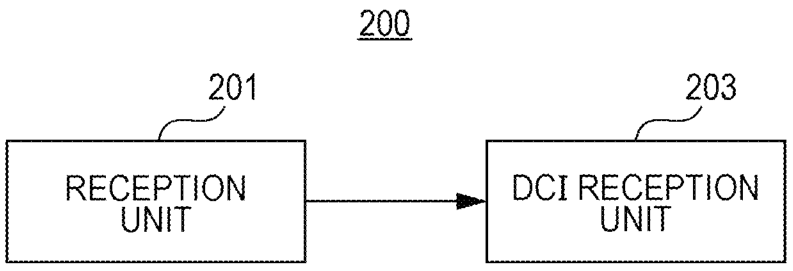
FIG. 2 illustrates a configuration of a portion of a terminal according to the first embodiment.

FIG. 2 is a block diagram that illustrates a configuration of a portion of the terminal 200 according to the embodiment of the present disclosure. In the terminal 200 illustrated in FIG. 2, a reception unit 201 receives signals, and a DCI reception unit 203 detects at least one search space that includes the plural control channel candidates to be the targets of detection of the control signal in the terminal 200 and identifies the control signal addressed to the own terminal from the signals.

Here, the number of detections in the search space by the terminal 200 is determined based on the settings of the terminal 200.

First Embodiment

[Configuration of Base Station]

Figure 3:
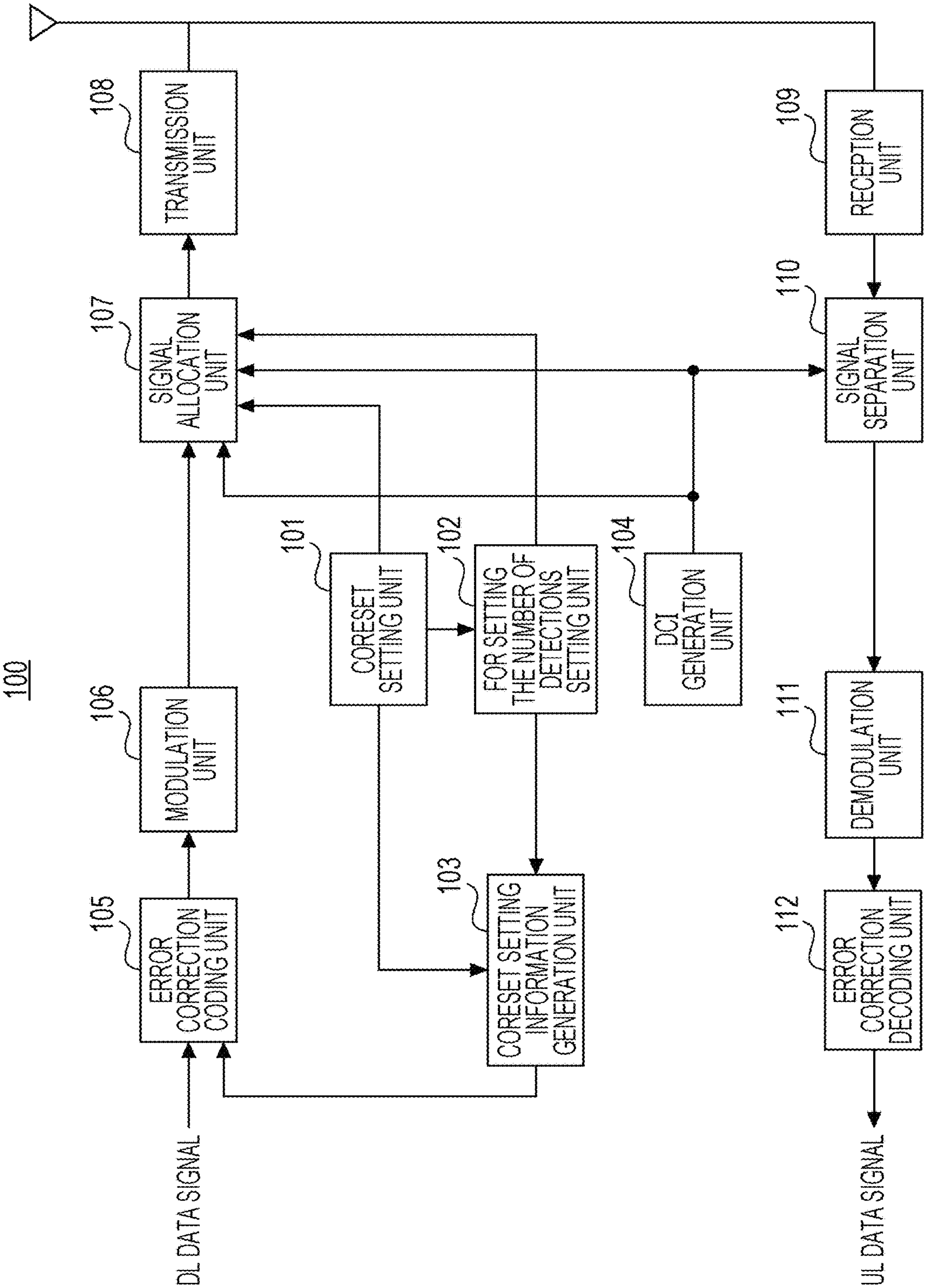
FIG. 3 illustrates a configuration of the base station according to the first embodiment.

FIG. 3 is a block diagram that illustrates a configuration of the base station 100 according to this embodiment. In FIG. 3, the base station 100 has a CORESET setting unit 101, the setting unit 102 for setting the number of detections, a CORESET setting information generation unit 103, a DCI generation unit 104, an error correction coding unit 105, a modulation unit 106, a signal allocation unit 107, the transmission unit 108, a reception unit 109, a signal separation unit 110, a demodulation unit 111, and an error correction decoding unit 112.

The CORESET setting unit 101 sets at least one CORESET for each terminal 200 (UE) and outputs information that indicates the set CORESET to the setting unit 102 for setting the number of detections, the CORESET setting information generation unit 103, and the signal allocation unit 107. Setting (defining) of the CORESET includes a physical resource block (PRB) number at which each CORESET is arranged, a symbol number, the number of symbols, presence or absence of interleaving, an ID used for scrambling the CORESET, and so forth, for example.

The setting unit 102 for setting the number of detections sets at least one search space (number of detections) that includes plural NR-PDCCH candidates to be targets of detection of the control signal (DCI) in the terminal 200. Specifically, the setting unit 102 for setting the number of detections sets the maximum number of detections in the search space per symbol and the maximum number of detections in the search space per component carrier (cell) or the number of detections in the search space for each CORESET based on information of the CORESET that is input from the CORESET setting unit 101 and information that indicates the slot or symbol configuration in which the CORESET is arranged (not illustrated). For example, the setting unit 102 for setting the number of detections sets a high number of detections in the search space in a case where the time interval of a slot or a symbol configuration is long but sets a low number of detections in the search space in a case where the time interval of the slot or symbol configuration is short. The setting unit 102 for setting the number of detections outputs information that indicates the set number of detections to the CORESET setting information generation unit 103 and the signal allocation unit 107.

The CORESET setting information generation unit 103 uses the information of the CORESET that is input from the CORESET setting unit 101 and the information that is input from the setting unit 102 for setting the number of detections and indicates the number of detections in the search space, thereby generates signaling (CORESET setting information) of an upper layer for CORESET setting, and outputs the signaling to the error correction coding unit 105.

The DCI generation unit 104 generates the control signal (DCI) that includes resource allocation information (DL allocation information or UL allocation information) which indicates resources to which a downlink (DL) data signal or an uplink (UL) data signal is allocated and outputs the DCI (the DL allocation information and the UL allocation information) to the signal allocation unit 107. Further, the DCI generation unit 104 outputs the DL allocation information in the generated control signal to the signal allocation unit 107 and outputs the UL allocation information to the signal separation unit 110.

The error correction coding unit 105 performs error correction coding of a transmission data signal (DL data signal) and the signaling of the upper layer (CORESET setting information) that is input from the CORESET setting information generation unit 103 and outputs the coded signal to the modulation unit 106.

The modulation unit 106 conducts a modulation process for the signal accepted from the error correction coding unit 105 and outputs the modulated signal to the signal allocation unit 107.

The signal allocation unit 107 allocates the signal accepted from the modulation unit 106 (the DL data signal and the CORESET setting information) to downlink resources based on the DL allocation information input from the DCI generation unit 104. Further, the signal allocation unit 107 allocates the DCI input from the DCI generation unit 104 to resources (CORESET). Note that the signal allocation unit 107 determines the resources to which the DCI is allocated based on the CORESET setting information input from the CORESET setting unit 101. For example, the signal allocation unit 107 changes the mapping from a resource element group (REG) to a control channel element (CCE) and the mapping from the CCE to the search space in accordance with the number of symbols of the CORESET included in the information input from the CORESET setting unit 101. Further, the signal allocation unit 107 determines the NR-PDCCH candidates in the CORESET based on the number of detections input from the setting unit 102 for setting the number of detections and determines the resources to which the DCI is allocated from the NR-PDCCH candidates. In such a manner, a transmission signal that includes the DCI mapped on any of the NR-PDCCH candidates is formed. The formed transmission signal is output to the transmission unit 108.

The transmission unit 108 conducts a wireless transmission process such as up-conversion for the transmission signal input from the signal allocation unit 107 and transmits the transmission signal to the terminal 200 via an antenna.

The reception unit 109 receives a signal transmitted from the terminal 200 via an antenna, conducts a wireless reception process such as down-conversion for a reception signal, and outputs the reception signal to the signal separation unit 110.

The signal separation unit 110 separates a UL data signal from the reception signal accepted from the reception unit 109 based on the UL allocation information input from the DCI generation unit 104 and outputs the UL data signal to the demodulation unit 111.

The demodulation unit 111 conducts a demodulation process for the signal input from the signal separation unit 110 and outputs the obtained signal to the error correction decoding unit 112.

The error correction decoding unit 112 decodes the signal input from the demodulation unit 111 and obtains a reception data signal (UL data signal) from the terminal 200.

[Configuration of Terminal]

Figure 4:
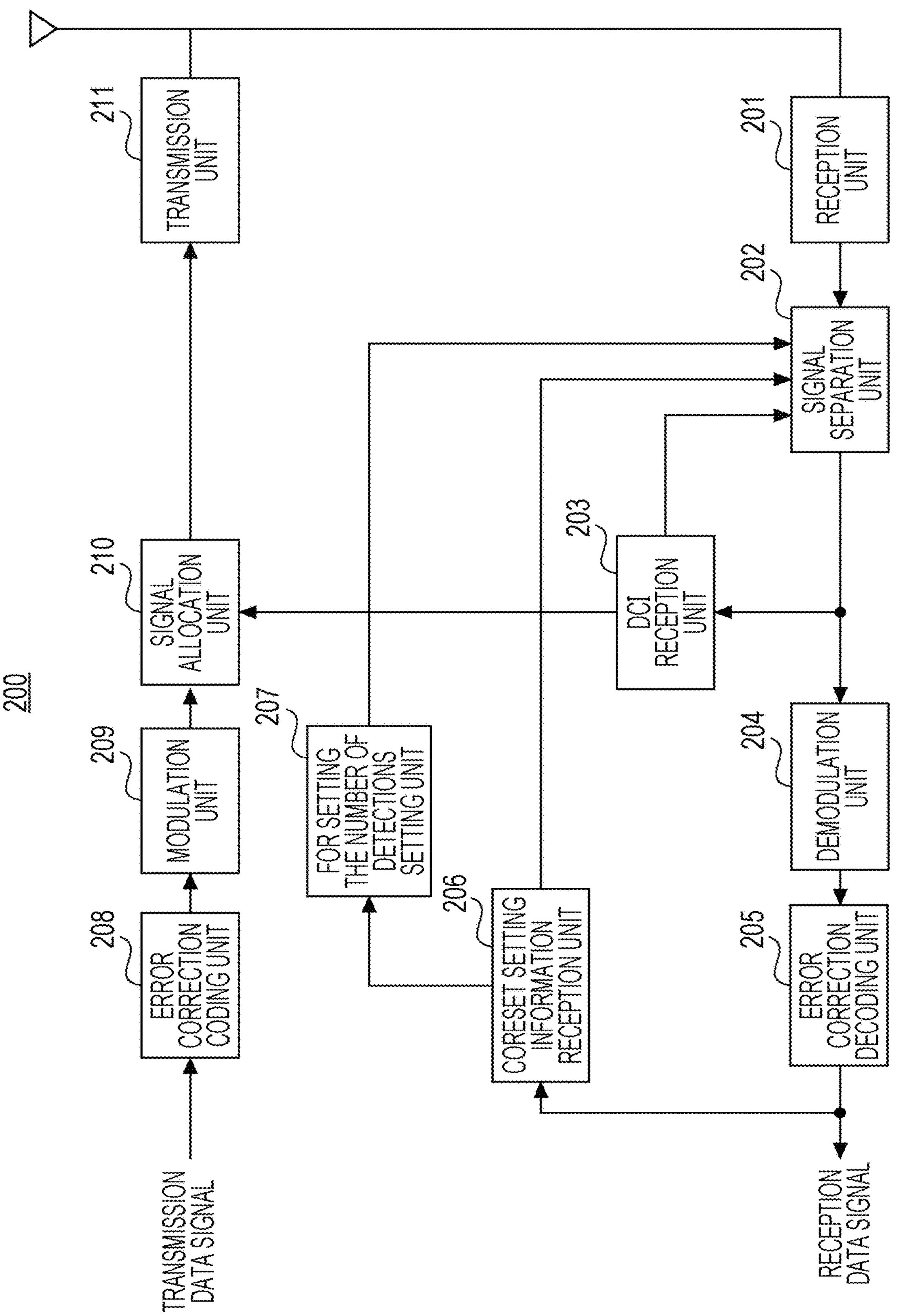
FIG. 4 illustrates a configuration of the terminal according to the first embodiment.

FIG. 4 is a block diagram that illustrates a configuration of the terminal 200 according to this embodiment. In FIG. 4, the terminal 200 has the reception unit 201, a signal separation unit 202, the DCI reception unit 203, a demodulation unit 204, an error correction decoding unit 205, a CORESET setting information reception unit 206, a setting unit 207 for setting the number of detections, an error correction coding unit 208, a modulation unit 209, a signal allocation unit 210, and a transmission unit 211.

The reception unit 201 conducts a reception process such as down-conversion for a reception signal received via an antenna and thereafter outputs the reception signal to the signal separation unit 202. The reception signal includes the DL data signal, upper layer signaling (which includes the CORESET setting information), or the like, for example.

The signal separation unit 202 separates a signal that is arranged in the resources, to which the signaling of the upper layer which includes the CORESET setting information is possibly allocated, from the reception signal accepted from the reception unit 201 and outputs the signal to the demodulation unit 204.

Further, the signal separation unit 202 identifies the resources that correspond to the CORESET to be monitored by the own terminal (the CORESET to be separated) based on information input from the CORESET setting information reception unit 206 and separates the signal arranged in the resources. Specifically, the signal separation unit 202 changes the resources (signal) to be separated in accordance with the number of symbols of the CORESET included in the information input from the CORESET setting information reception unit 206. Further, the signal separation unit 202 identifies the NR-PDCCH candidate in the CORESET based on the number of detections in the search space that is input from the setting unit 207 for setting the number of detections and outputs the signal arranged in the resources as the NR-PDCCH candidate (the search space of the terminal 200) to the DCI reception unit 203.

Further, the signal separation unit 202 separates the DL data signal from the reception signal based on the DL allocation information input from the DCI reception unit 203 and outputs the DL data signal to the demodulation unit 204.

The DCI reception unit 203 detects (monitoring or blind decoding) the signal input from the signal separation unit 202 (the signal arranged in the resources as the NR-PDCCH candidates (search space)), identifies the DCI addressed to the own terminal, and decodes (receives) the DCI. The DCI reception unit 203 outputs the UL allocation information indicated by the received DCI to the signal allocation unit 210 and outputs the DL allocation information to the signal separation unit 202.

The demodulation unit 204 demodulates the signal input from the signal separation unit 202 and outputs the demodulated signal to the error correction decoding unit 205.

The error correction decoding unit 205 decodes the demodulated signal that is accepted from the demodulation unit 204, outputs the obtained reception data signal, and outputs the obtained signaling of the upper layer to the CORESET setting information reception unit 206.

The CORESET setting information reception unit 206 identifies the settings of the CORESET for each terminal 200 based on the CORESET setting information included in signaling of the upper layer output from the error correction decoding unit 205. Then, the CORESET setting information reception unit 206 outputs identified information to the signal separation unit 202 and the setting unit 207 for setting the number of detections.

The setting unit 207 for setting the number of detections sets the maximum number of detections in the search space per symbol and the maximum number of detections in the search space per component carrier (cell) or the number of detections in the search space for each CORESET based on the information of the CORESET that is input from the CORESET setting information reception unit 206. The setting unit 207 for setting the number of detections outputs information that indicates the set number of detections to the signal separation unit 202.

The error correction coding unit 208 performs error correction coding of the transmission data signal (UL data signal) and outputs the coded data signal to the modulation unit 209.

The modulation unit 209 modulates the data signal input from the error correction coding unit 208 and outputs the modulated data signal to the signal allocation unit 210.

The signal allocation unit 210 identifies the resources to which UL data are allocated based on the UL allocation information input from the DCI reception unit 203. Then, the signal allocation unit 210 allocates the data signal input from the modulation unit 209 to the identified resources and outputs the data signal to the transmission unit 211.

The transmission unit 211 conducts a transmission process such as up-conversion for the signal input from the signal allocation unit 210 and transmits the signal via an antenna.

[Actions of Base Station 100 and Terminal 200]

A detailed description will be made about actions in the base station 100 and the terminal 200 that have the above configurations.

Figure 5:
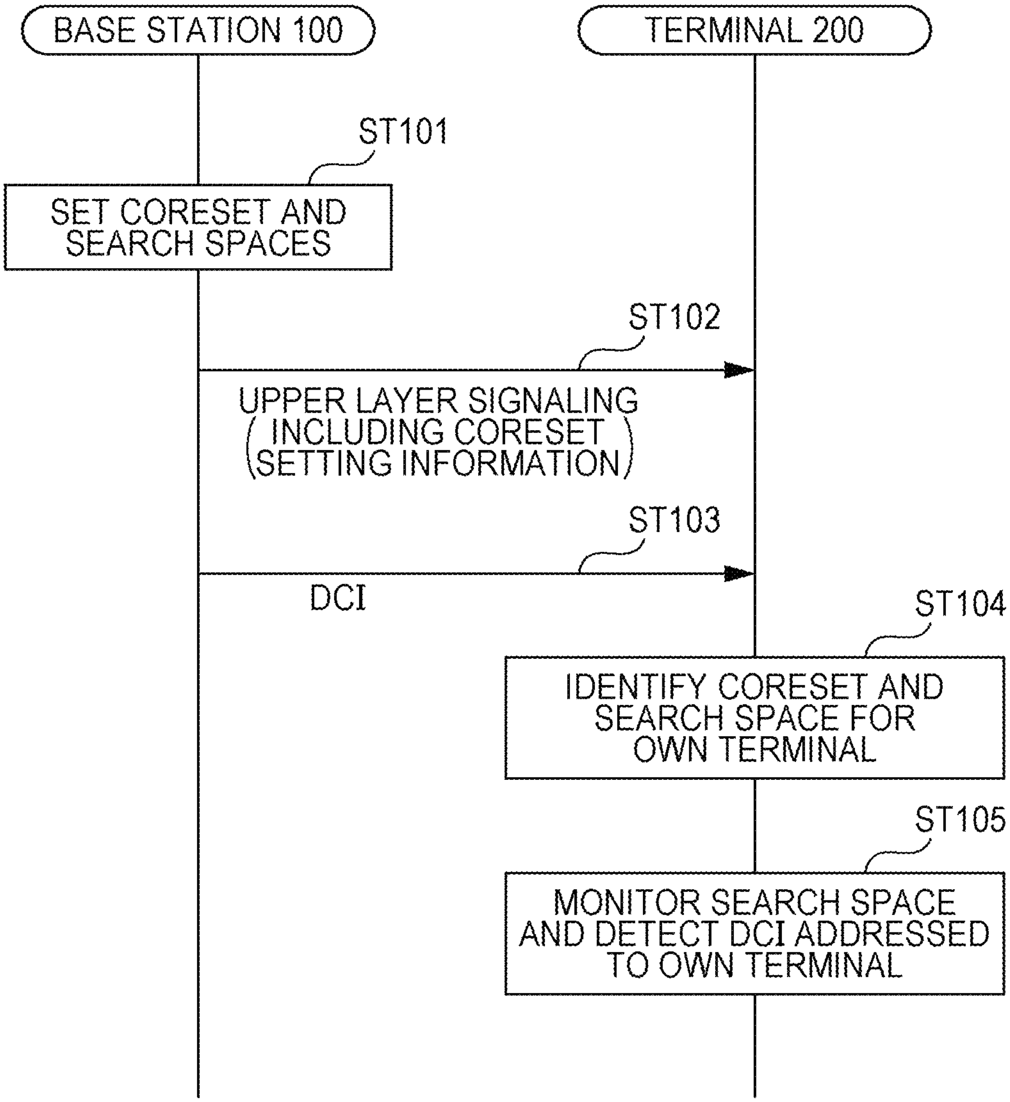
FIG. 5 illustrates an action example of the base station and the terminal according to the first embodiment.

FIG. 5 is a sequence diagram that illustrates the actions of the base station 100 and the terminal 200.

The base station 100 performs settings of the CORESET and the search spaces (NR-PDCCH candidates) in the CORESET for the terminal 200 (resources of the CORESET, the number of detections in the search space, and so forth) (ST101). The base station 100 transmits, to the terminal 200, the CORESET setting information that indicates the settings of the set CORESET and search space (number of detections) by using the signaling of the upper layer (ST102).

Next, the base station 100 arranges the DCI (the resource allocation information or the like) in any of the search spaces in the CORESET set in ST101 and transmits the DCI to the terminal 200 (ST103).

Meanwhile, the terminal 200 identifies the CORESET to be monitored by the own terminal and the search space (NR-PDCCH candidate) to be the detection target of the DCI in the CORESET based on the CORESET setting information included in the signaling of the upper layer that is received in ST102 (ST104). Then, the terminal 200 monitors the identified search space in the CORESET and detects the DCI addressed to the own terminal (ST105).

Next, a description will be made about a setting method of the number of detections in the search space in the CORESET, which is set for the terminal 200.

In this embodiment, the base station 100 determines the number of detections in the search space in the CORESET, which is set for the terminal 200, based on the slot or the symbol configuration (time resource configuration) in which the CORESET (NR-PDCCH candidate) is arranged.

In a detection process of the search space, it is anticipated that the time requested for the detection process will become longer as the number of detections becomes higher. Consequently, the upper limit value of the number of detections in the search space becomes variable depending on the time that is usable for the detection process.

Figure 6:
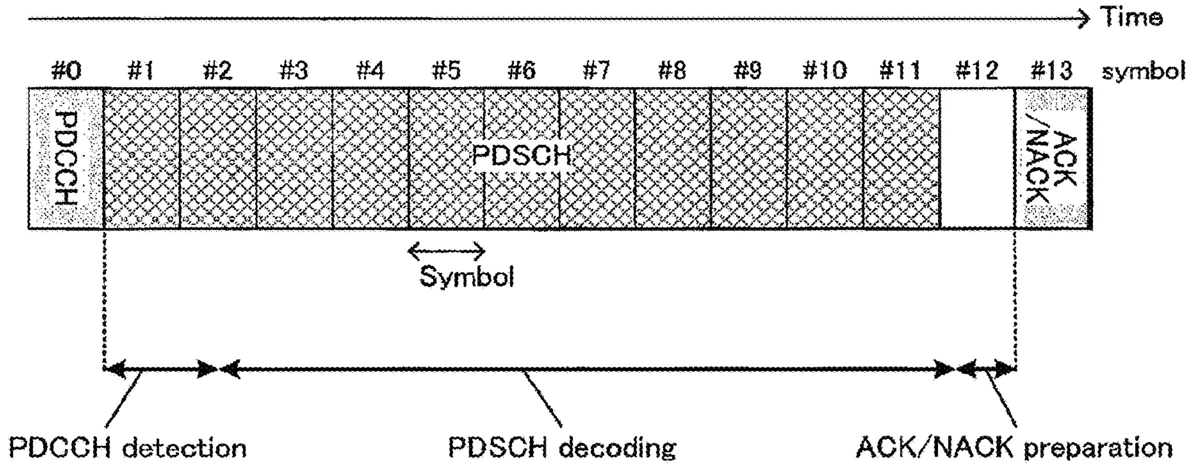
FIG. 6 illustrates a configuration example of a slot.

FIG. 6 illustrates one example of a slot (time axis) that is configured with 14 symbols. In FIG. 6, the PDCCH is arranged in symbol #0, the PDSCH (DL data) is arranged in symbols #1 to #11, and ACK/NACK is arranged in symbol #13. Further, the arrows indicated in a lower part of FIG. 6 indicate examples of the process times of the processes of PDCCH detection, PDSCH decoding, and ACK/NACK generation (ACK/NACK preparation). The terminal 200 secures the time for decoding the PDSCH, generates an ACK or NACK signal based on the reception result of the PDSCH, and finishes the detection process of the PDCCH such that the ACK signal or NACK signal may be transmitted at symbol #13.

That is, the number of detections in the search space has to be set to the number by which the PDCCH may be detected in this PDCCH detection process time.

For example, the base station 100 sets a high number of detections in the search space in a case where the time interval of the slot or symbol configuration is long but sets a low number of detections in the search space in a case where the time interval of the slot or symbol configuration is short.

In such a manner, in a case where the time interval of the slot or symbol configuration is long and the terminal 200 has extra time in the detection time of search space, the number of detections may be increased, and the collision probability between signals in the search space may be reduced. Further, in a case where the time interval of the slot or symbol configuration is short and the terminal 200 does not have extra time in the detection time of search space, the terminal 200 may complete detection of the DCI in the time by lessening the number of detections.

Further, in this embodiment, the number of detections in the search space is set as the maximum number of detections per symbol and the maximum number of detections per component carrier (cell) or the number of detections per CORESET. The maximum number of detections per symbol and the maximum number of detections per component carrier (cell) are values that are defined such that the total value of the numbers of detections per symbol of plural CORESETs does not exceed the maximum value particularly in a case where plural CORESETs are allocated to the terminal 200. The number of detections per CORESET is used particularly in a case where the number of detections is in advance provided in a common search space, a group common search space, or the like. The following action examples may be applied in any cases.

Next, specific action examples according to this embodiment will be described.

Action Example 1-1

In action example 1-1, the base station 100 determines the number of detections in the search space based on a subcarrier interval (subcarrier spacing (SCS)) that is set for the terminal 200. That is, in action example 1-1, as a parameter that indicates the slot or symbol configuration, the subcarrier interval (subcarrier spacing (SCS)), in other words, time per symbol is used.

Figure 7:
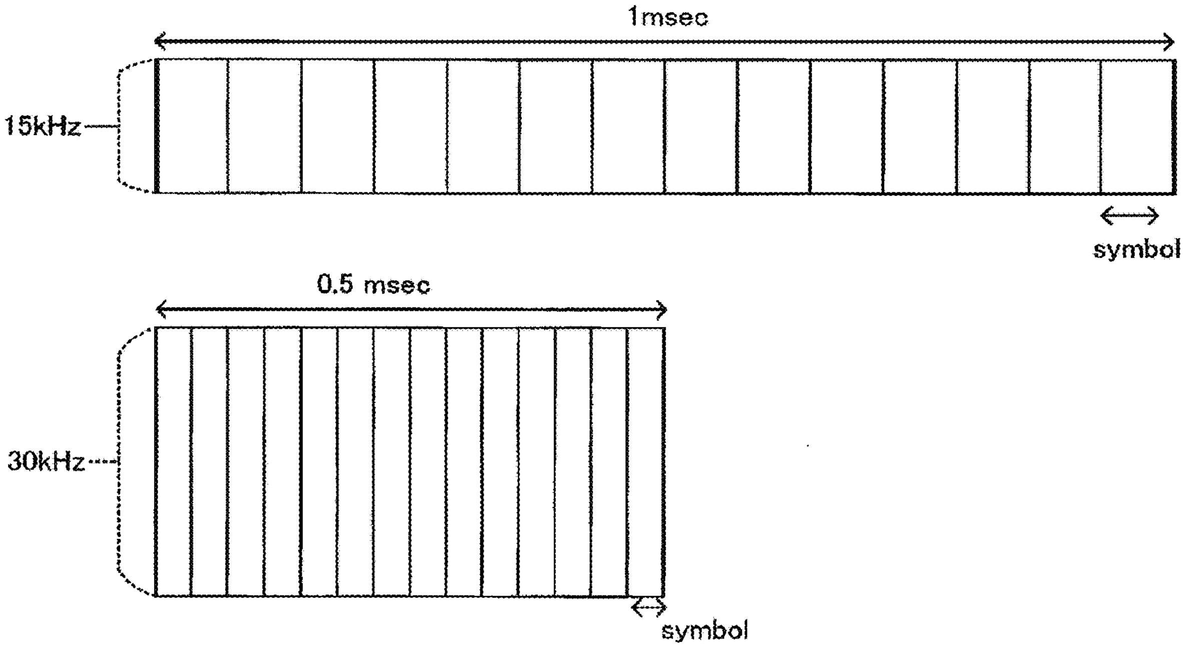
FIG. 7 illustrates examples of symbols whose subcarrier intervals are 15 kHz and 30 kHz.

In NR, as the subcarrier interval, plural intervals that satisfy $2^m$*15 kHz (m is a non-negative integer) are discussed. For example, the subcarrier intervals are 15 kHz, 30 kHz, 60 kHz, 120 kHz, 240 kHz, and so forth. As the subcarrier interval becomes wider, the time per symbol becomes shorter. For example, as illustrated in FIG. 7, the symbol length for the 30 kHz interval is half a length of the symbol length of the 15 kHz interval. However, because a symbol that is longer than another symbol by 16 $T_s$ ($T_s$=1/(15000×2048) second) for each 0.5 m second is present in order to adjust the subframe interval, the symbol does not accurately have half the length of the symbol length of the 15 kHz interval.

In action example 1-1, the base station 100 sets a higher number of detections in the search space as the subcarrier interval set for the terminal 200 is narrower (in other words, as the time per symbol is longer) and sets a lower number of detections in the search space as the subcarrier interval is wider (in other words, as the time per symbol is shorter). This is because even if the number of symbols that may be used for detection of the search space is the same, the time per symbol becomes shorter as the subcarrier interval becomes wider, and absolute time that may be used for detection of the search space becomes shorter.

For example, as illustrated in FIG. 8, the base station 100 may set the number of detections in the search space in a case where the subcarrier interval is 15 kHz as a reference (Y times) and may perform settings such that the numbers of detections in the search spaces in cases of the other subcarrier intervals are inversely proportional to the subcarrier intervals. In other words, the number of detections in the search space has a proportional relationship with the symbol length.

In such a manner, the base station 100 may set the number of detections in the search space proportionally to the absolute time of the slot or symbol. For example, the base station 100 may set a higher number of detections in the search space as the absolute time of the symbol is longer.

Note that the correspondence relationship between the subcarrier interval (the absolute time of the symbol) and the number of detections in the search space is not limited to the example illustrated in FIG. 8. For example, as illustrated in FIG. 9, the base station 100 may perform settings such that the number in the search space is stepwise reduced as the subcarrier interval becomes wider, although not completely inversely proportional.

Further, the subcarrier interval set for the terminal 200 is associated with the frequency band set for the terminal 200. For example, it is possible that 15 kHz, 30 kHz, and 60 kHz as narrow subcarrier intervals are used in a lower band than 6 GHZ (below 6 GHz) and 120 kHz and 240 kHz as wide subcarrier intervals are used in a higher band than 6 GHz (above 6 GHZ). This is because an influence of phase noise that fluctuates in the time-axis direction becomes large in a high frequency band and because the symbol interval is shortened by widening the subcarrier interval and the influence of phase noise may thereby be reduced. Consequently, the base station 100 may set the number of detections in the search space based on the frequency band set for the terminal 200. For example, the base station 100 may set a lower number of detections in the search space as the frequency band becomes higher.

Action Example 1-2

In action example 1-2, the base station 100 determines the number of detections in the search space based on the number of symbols that configure the slot set for the terminal 200. That is, in action example 1-2, as a parameter that indicates the slot or symbol configuration, the number of symbols in the slot is used.

Here, a slot is a time unit that includes one or plural symbols. A slot configuration represents a slot of 14 symbols, a slot of 7 symbols, a mini-slot, or the like, for example.

In NR, the slot of 14 symbols or the slot of 7 symbols are discussed for subcarrier intervals of 60 kHz or lower, and the slot of 14 symbols is discussed for a case where the subcarrier interval is wider than 60 kHz.

Further, as the number of symbols of the mini-slot, a length of one symbol to a length of plural symbols are discussed for a higher band than 6 GHz. It is assumed that the mini-slot is used in a case where allocation of time resources is restricted such as a system strict about latency like URLLC or unlicensed band, a case where data of plural terminals (UE) are multiplexed by time division multiplexing (TDM), or the like.

Here, assuming a case where the number of symbols of the mini-slot is less than 7 symbols, the usable time for detection of the search space becomes shorter in the order of the slot of 14 symbols, the slot of 7 symbols, and the mini-slot. This is because as the number of symbols in the slot becomes shorter, the time that may be used for decoding the PDSCH becomes shorter in the terminal 200. On the other hand, in a case where the time that may be used for decoding the PDSCH is long in the terminal 200, even if detection of the search space takes time, it is possible that the decoding time for the PDSCH may be secured by decoding the PDSCH fast.

Consequently, in action example 1-2, the base station 100 sets a higher number of detections in the search space for the slot of 14 symbols than the slot of 7 symbols and the mini-slot and sets a higher number of detections in the search space for the slot of 7 symbols than the mini-slot. That is, the base station 100 increases the settings of the number of detections in the search space in the order of the mini-slot, the slot of 7 symbols, and the slot of 14 symbols.

In such a manner, because extra time is provided for decoding of the PDSCH in a case where the number of symbols in the slot is large, the base station 100 may set a high number of detections in the search space. Particularly, because it is assumed that data of plural pieces of UE are simultaneously allocated to the slot of 14 symbols, the collision probability between the pieces of UE in the search space may be reduced by increasing the number of detections in the search space.

Further, because extra time is not provided for decoding of the PDSCH in a case where the number of symbols in the slot is small, the base station 100 sets a low number of detections in the search space. However, it is assumed that the number of pieces of UE that are simultaneously allocated to 7 symbols or the mini-slot is small compared to the slot of 14 symbols, and the collision probability between the pieces of UE in the search space is not high. Thus, even if a low number of detections in the search space is set for 7 symbols or the mini-slot, an influence on the collision between the pieces of UE in the search space is small. Further, a low number of detections in the search space is set, the complexity of processing in the terminal 200 may thereby be reduced, and the power consumption of the terminal 200 may be lowered.

Note that the distinctions among slot formats such as the slot of 14 symbols, the slot of 7 symbols, and the mini-slot may be notified to the terminal 200 by SIB1 included in a physical broadcast channel (PBCH), may be set such that the terminal 200 may discriminate the slot formats during a RACH procedure, may be notified by the signaling of the upper layer (radio resource control (RRC) signaling) of an individual piece of UE, or may simultaneously be set when the CORESET used for allocation of the DCI is set.

Note that in a case where the slot format is distinguished by the SIB1 or the RACH procedure, it is assumed that the slot format is not frequently changed and the UE continues reception in the same slot format. Further, in a case where the notification of the slot format is performed by the signaling of the upper layer of an individual piece of UE or is associated with the settings of CORESET, it is possible to change the slot format by the signaling of the upper layer.

Further, discussion is made about a case where the number of symbols of the PDSCH in the slot and the time interval between the final symbol of the PDSCH and ACK/NACK transmission (after how many symbols ACK/NACK is transmitted) are in advance set by the signaling of the upper layer. In a case where the time interval between the final symbol of the PDSCH and ACK/NACK transmission is long, the detection time of search space may be made long because extra decoding time for the PDSCH is provided. Thus, the base station 100 may set a high number of detections in the search space in a case where the time interval between the final symbol of the PDSCH and ACK/NACK transmission is long and may set a low number of detections in the search space in a case where a transmission time between the final symbol of the PDSCH and ACK/NACK transmission is short.

Other Action Examples (1) the Number of Detections in the Search Space May be Set Based on UE Capability or Category.

The UE capability or category is performance of the UE that is provided by the maximum transport block size which may be transmitted and received by the UE, the size of a soft buffer, the number of supported layers of spatial multiplexing, and so forth. For example, the UE with a larger transport block size, a larger size of the soft buffer, the larger number of layers of spatial multiplexing may be considered to be the UE with higher performance (the UE capability is higher).

Further, the base station 100 may set the number of detections in the search space based on the performance of the UE about a PRB process, a demodulation process, and a decoding process of polar codes or the like as the UE capability or category. Here, the PRB process is a series of processes in which extraction of a desired PRB to be the NR-PDCCH candidate, a channel estimation process, a channel equalization process based on request, and so forth are conducted with respect to the reception signal. The UE whose executable frequency per unit time of the PRB process or the demodulation process is higher may be considered to be the UE with higher performance.

Consequently, it is anticipated that the processing capability of the UE with high performance will be high compared to the UE with low performance. Thus, the base station 100 may set a high number of detections in the search space for the UE with high performance and may set a low number of detections in the search space for the UE with low performance.

Here, as an example where the number of detections in the search space is set based on the performance of the UE about the PRB process, the demodulation process, and the decoding process of polar codes or the like as the UE capability or category, a description will be made about a method for setting the number of detections in the search space based on the executable frequency per unit time of the channel estimation process. Note that as described above, a search space detection process or detection time depends on the executable frequency of the channel estimation process (also referred to as channel estimation capability). Thus, in the following description, the magnitude of the number of detections in the search space will be expressed by the number of PRBs (or the number of CCEs that are configured with plural PRBs) as the executable frequency per unit time of the channel estimation process.

Figure 10A:
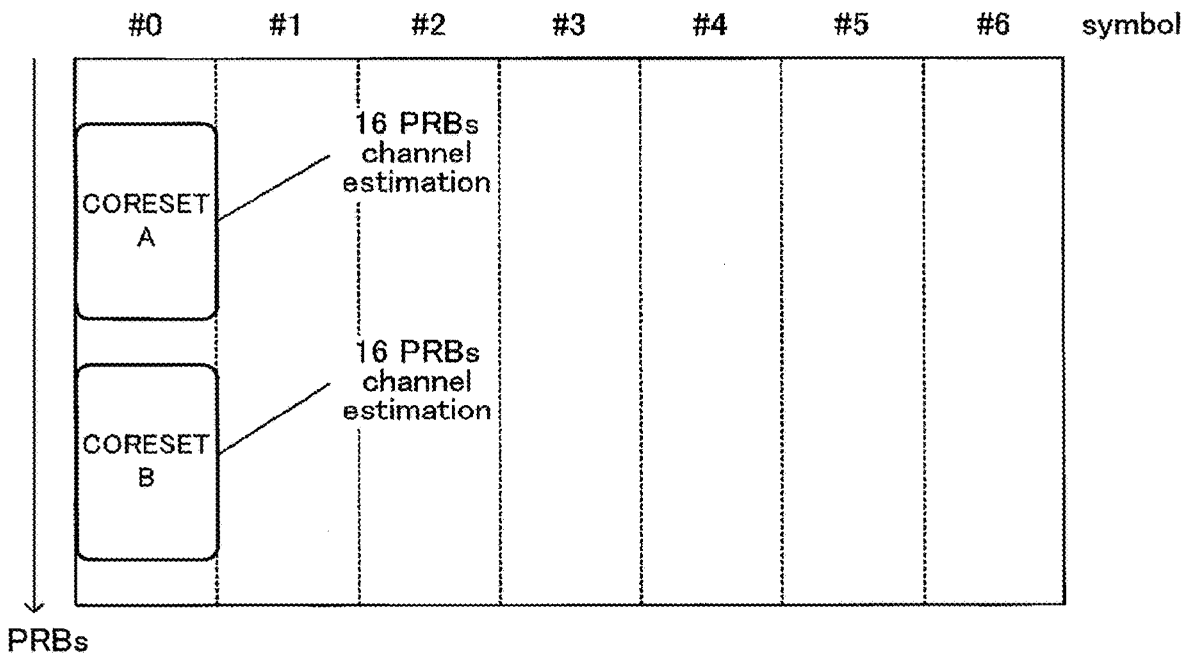
FIG. 10A illustrates an arrangement example of CORESETs allocated to the terminal according to another action example of the first embodiment.
Figure 10B:
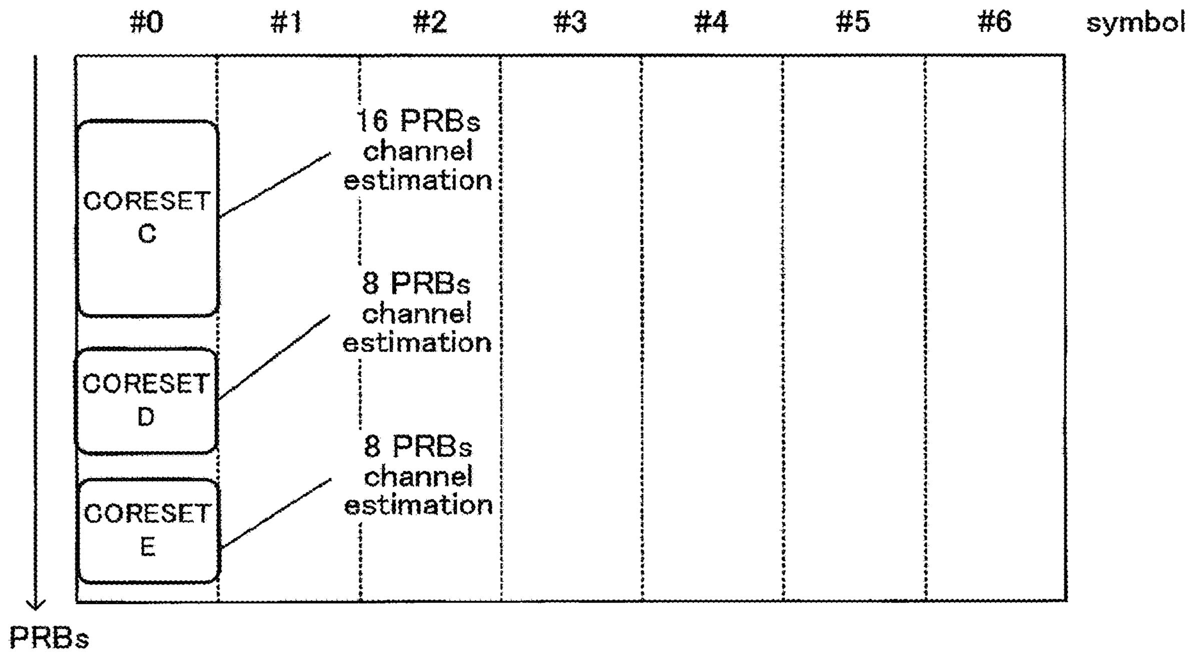
FIG. 10B illustrates an arrangement example of CORESETs allocated to the terminal according to another action example of the first embodiment.

FIG. 10A and FIG. 10B illustrate examples where the base station 100 sets plural CORESETs by the CORESET setting unit 101 and the setting unit 102 for setting the number of detections in a case where the executable frequency of the channel estimation process as the UE capability or category is provided as 32 PRBs.

FIG. 10A illustrates an example where the base station 100 sets two CORESETs, which are a CORESET A and a CORESET B. From 32 PRBs as the executable frequency of the channel estimation process by the UE, 16 PRBs are set for the CORESET A. Similarly, 16 PRBs from 32 PRBs as the executable frequency of the channel estimation process by the UE are set for the CORESET B.

Meanwhile, FIG. 10B illustrates an example where the base station 100 sets three CORESETs, which are a CORESET C, a CORESET D, and a CORESET E. From 32 PRBs as the executable frequency of the channel estimation process by the UE, 16 PRBs are set for the CORESET C. Similarly, 8 PRBs from 32 PRBs as the executable frequency of the channel estimation process by the UE are set for each of the CORESET D and the CORESET E.

As illustrated in FIG. 10A and FIG. 10B, the base station 100 may set plural CORESETs in the range of the provided executable frequency of the channel estimation process by the UE. Note that in FIG. 10A and FIG. 10B, a description is made about cases where one symbol is set for the CORESET. However, the number of symbols is not limited to this, and plural symbols may be set for the CORESET in the range of the provided executable frequency of the channel estimation process by the UE.

(2) the Number of Detections in the Search Space May be Set Based on a Service Category.

The service categories are eMBB, URLLC, mMTC, and so forth. For example, because URLLC is strict about latency, it is possible that in order to reduce latency of detection of the search space, a low number of detections in the search space is set compared to eMBB. Further, in mMTC, due to low performance of the UE and in order to reduce the power consumption, it is possible that a low number of detections in the search space is set compared to eMBB.

(3) the Number of Detections in the Search Space May be Set Based on Digital Beamforming, Analog Beamforming, and Hybrid Beamforming (a Combination of Digital Beamforming and Analog Beamforming).

In a case where digital beamforming is used, it is possible that plural pieces of UE are multiplexed in the same slot. Meanwhile, in a case where analog beamforming is used, because the degree of freedom of the direction of beam is low, it is anticipated that the number of pieces of UE allocated to the same slot will become small compared to digital beamforming. Thus, in a case of analog beamforming, because the collision probability between the pieces of UE in the search space is low, the influence is small even if the number of detections in the search space is reduced.

Thus, the base station 100 set a lower number of detections in the search space for the terminal 200 to which analog beamforming is applied than the number of detections in the search space for the terminal 200 to which digital beamforming is applied. Accordingly, the terminal 200 to which analog beamforming is applied has benefit in which the complexity of the search space detection process may be reduced and the power consumption of the terminal 200 may be lowered.

Further, because hybrid beamforming corresponds to intermediate beamforming between digital beamforming and analog beamforming, the base station 100 may set a lower number of detections in the search space for the terminal 200 to which hybrid beamforming is applied than the number of detections in the search space in a case where digital beamforming is applied and may set a higher number of detections in the search space than the number of detections in the search space in a case where analog beamforming is applied. Accordingly, the number of detections may be reduced while the number of detections in the search space requested for the terminal 200 to which hybrid beamforming is applied is secured.

In the above, the specific action examples according to this embodiment are described.

Note that the above action example may be applied alone, or plural action examples may be applied in combination.

In such a manner, in this embodiment, the base station 100 sets the number of detections in the search space (NR-PDCCH candidate) to be the target of detection of the DCI by the terminal 200 based on the settings of the terminal 200 (for example, the slot or symbol configuration, the UE capability or category, the service category, beamforming settings, and so forth).

Accordingly, for example, in a case where the terminal 200 has extra time in the detection time of search space, the collision probability between the pieces of UE in the search space may be reduced by increasing the number of detections in the search space. Further, in a case where extra time is not provided in the detection time of search space, the terminal 200 may complete detection of the DCI in the time by reducing the number of detections in the search space.

That is, in this embodiment, the number of detections in the search space with respect to the terminal 200 is set variable in accordance with the settings of the terminal 200, and the search space may thereby flexibly be set for each terminal 200 or each CORESET. Accordingly, a case may be avoided where the terminal 200 may not fully use the search space detection capability (number of detections) or where the number of detections that is the search space detection capability of the terminal 200 or higher is set.

As described above, in this embodiment, the terminal 200 may monitor the search space in the CORESET and may appropriately detect the DCI.

Note that in this embodiment, a case is described where the number of detections in the search space is notified by the signaling of the upper layer. However, in a case where the number of detections in the search space may be calculated in each of the base station 100 and the terminal 200 by using the same information and calculation formulas between the base station 100 and the terminal 200, the signaling of the upper layer for the number of detections in the search space is not requested.

In this case, in the base station 100 (see FIG. 3), the information that indicates the number of detections in the search space set in the setting unit 102 for setting the number of detections is not output to the CORESET setting information generation unit 103 but to the signal allocation unit 107. Further, in the terminal 200 (see FIG. 4), similarly to the setting unit 102 for setting the number of detections of the base station 100, the setting unit 207 for setting the number of detections determines the maximum number of detections per symbol and the maximum number of detections per component carrier (cell) or the number of detections for each CORESET based on the information input from the CORESET setting information reception unit 206 and the slot or symbol configuration in which the CORESET is arranged (not illustrated). For example, the terminal 200 sets a high number of detections in the search space in a case where the time interval of the slot or symbol configuration is long but sets a low number of detections in the search space in a case where the slot or symbol configuration is short. Then, the setting unit 207 for setting the number of detections outputs the information that indicates the set number of detections to the signal separation unit 202.

Second Embodiment

A base station and a terminal according to this embodiment have basic configurations common to the base station 100 and the terminal 200 according to the first embodiment and will thus be described making reference to FIG. 3 and FIG. 4.

Description About Time First Mapping and Frequency First Mapping

The NR-PDCCH as a control signal is arranged in one or plural CCEs. The number of CCEs in which the NR-PDCCH is arranged is referred to as "aggregation level" (which may hereinafter be abbreviated as "AL").

Further, the CCE is configured with plural REGs. In NR, setting the number of REGs per CCE to six is discussed. Further, in NR, as one mode of the REG, setting one symbol in the PRB as the REG is discussed.

Figure 11A:
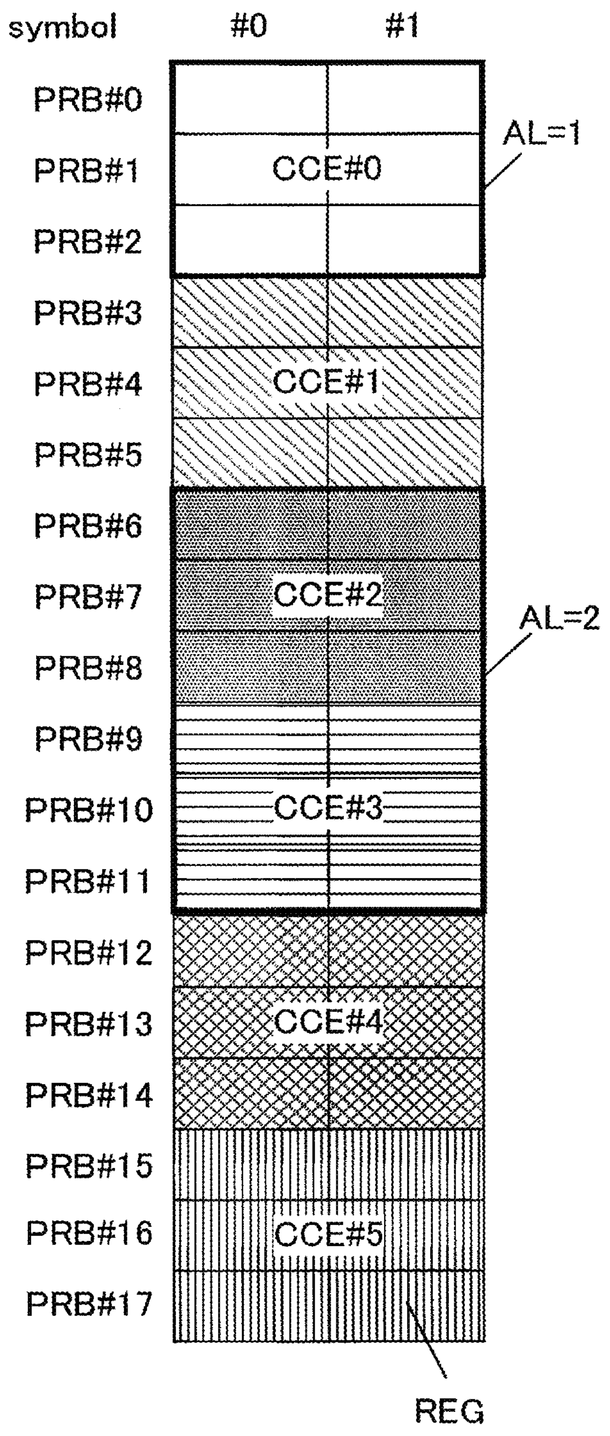
FIG. 11A illustrates one example of time first mapping.
Figure 11B:
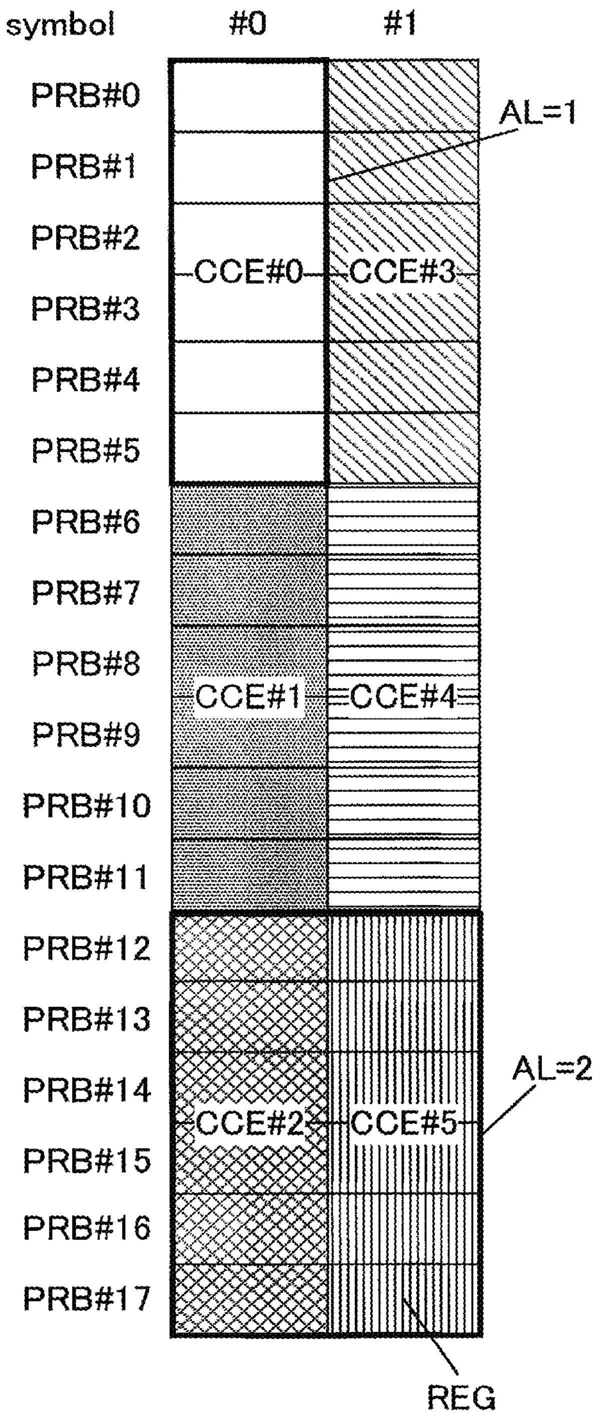
FIG. 11B illustrates one example of frequency first mapping.

In a case of such a mode, as a configuration of the CCE, as illustrated in FIG. 11A, a case is possible where the CCE is configured with the REGs arranged in plural symbols (hereinafter referred to as "time first mapping"), and as illustrated in FIG. 11B, a case is possible where the CCE is configured with the REGs arranged in the same symbol (hereinafter referred to as "frequency first mapping").

The time first mapping illustrated in FIG. 11A has benefit in which, in a case where the transmission power that is usable for each symbol is restricted, the NR-PDCCH is transmitted by plural symbols and the transmission power of the NR-PDCCH may thereby be improved. Further, the frequency first mapping illustrated in FIG. 11B has benefit in which the number of symbols occupied by the CCE is decreased and the resource amount allocated to the PDSCH is increased.

In the above, the time first mapping and the frequency first mapping are described.

As for the NR-PDCCH, in a case where the UE is set to detect search spaces of plural CORESETs, setting the number of symbols variable for each CORESET is discussed. As for the number of symbols of the CORESET, setting one symbol to all symbols in the slot or the subframe is considered, and particularly setting one to three symbols is discussed.

In such a manner, because the number of symbols for each CORESET is variable in the NR-PDCCH, the time when detection of the search space may be started is possibly different depending on the CORESET. Consequently, there is a problem in that when the number of detections in the search space is determined for each CORESET and the total of the number of detections in the search space for each CORESET is set as the maximum value, the search space detection capability (number of detections) may not be fully used depending on the UE, or the number of detections that is the detection capability of the UE or higher is set.

Accordingly, in this embodiment, the base station 100 sets the maximum number of detections per component carrier (cell) for each symbol and sets the number of detections in the search space for each CORESET for the terminal 200 in a range in which the maximum value for each symbol is not exceeded. Here, the base station 100 counts the number of detections in the search space at the final symbol in the symbols, in which the NR-PDCCH candidate is arranged, with respect to each of the NR-PDCCH candidates in the search space.

That is, in this embodiment, the maximum value of the number of detections in the search space (maximum number of detections) by the terminal 200 is set for each of the symbols in which plural NR-PDCCH candidates (CORESETs) are arranged. Then, the base station 100 (the setting unit 102 for setting the number of detections) sets the number of detections for each of plural NR-PDCCH candidates in the search spaces of the CORESET within the maximum number of detections at the final symbol in the symbols in which the NR-PDCCH candidates are arranged.

In such a manner, because the numbers of detections are separately counted among the CORESETs (NR-PDCCH candidates) with different final symbols, the total of the numbers of detections in plural CORESETs (plural NR-PDCCH candidates) may be increased.

Note that the base station 100 (gNB) notifies the terminal 200 of the number of detections (sets to the terminal 200 the number of detections) for each aggregation level in each CORESET by the signaling of the upper layer, for example, RRC signaling. In such a manner, the base station 100 may specifically set the number of detections for each terminal 200 and for each aggregation level.

In the following, specific action examples according to this embodiment will be described.

Action Example 2-1: Time First Mapping

In the time first mapping, as illustrated in FIG. 11A, it is assumed that one CCE is arranged in plural symbols. Thus, the NR-PDCCH candidates in the CORESET are arranged to the final symbol of the CORESET. In other words, in the time first mapping, the final symbol in the symbols in which the NR-PDCCH candidates are arranged is the final symbol in which the CORESET is arranged.

Consequently, in the time first mapping, the base station 100 counts the number of detections in the search space at the final symbol of each CORESET. Further, the base station 100 sets the number of detections in the search space for each CORESET for the terminal 200 in the range in which the counted number of detections does not exceed the maximum value for each symbol.

Figure 12:
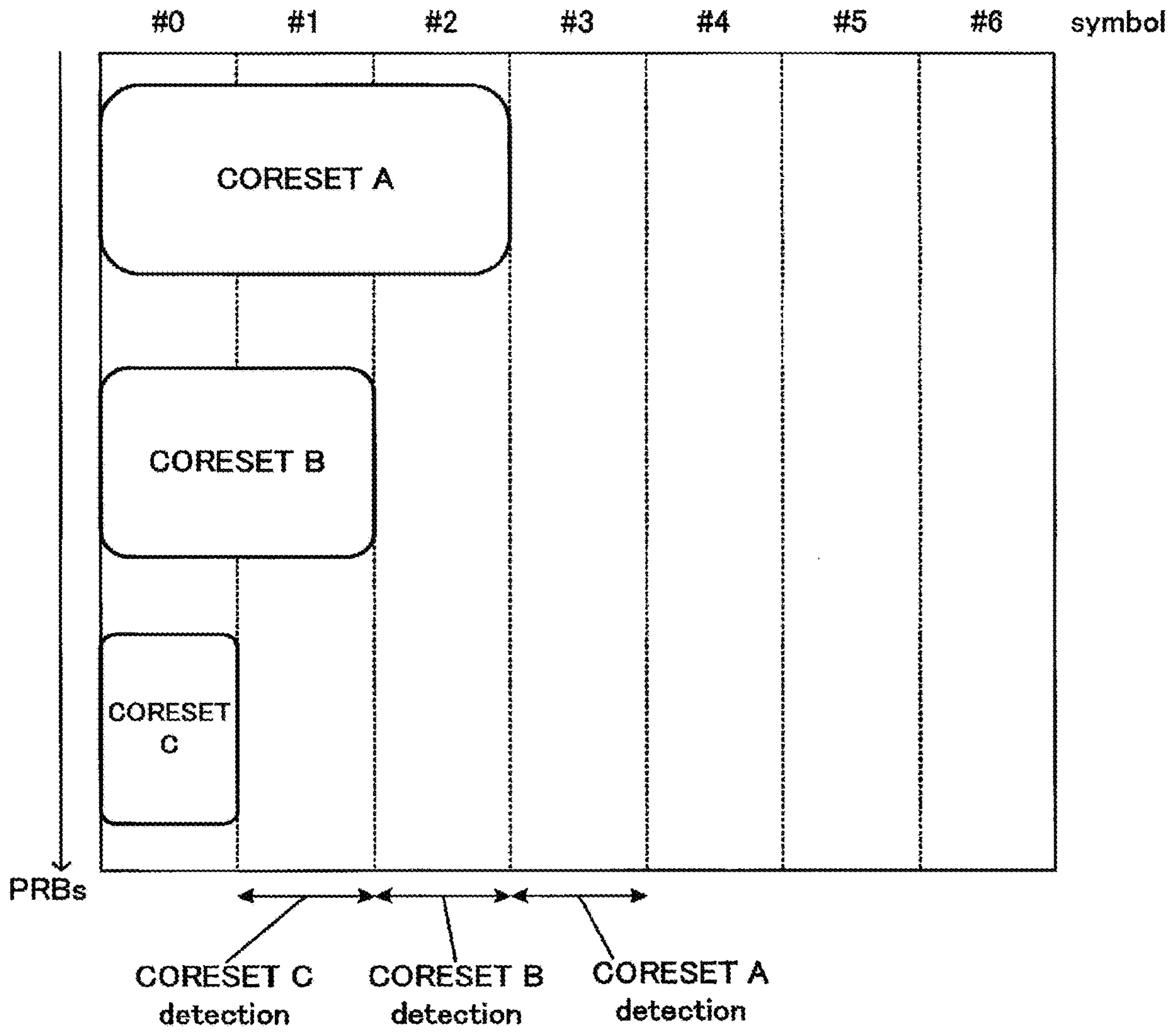
FIG. 12 illustrates an arrangement example of CORESETs allocated to the terminal according to action example 2-1 of a second embodiment.

FIG. 12 illustrates an example where in action example 2-1, a CORESET A whose number of symbols is three (symbols #0 to #2), a CORESET B whose number of symbols is two (symbols #0 and #1), and a CORESET C whose number of symbols is one (symbol #0) are allocated to the terminal 200. Further, in FIG. 12, the maximum number of detections per symbol is set to Y times.

In FIG. 12, the terminal 200 starts the detection process in each CORESET after the reception process of the final symbol in which each CORESET is arranged. That is, in FIG. 12, the terminal 200 starts the detection process for the CORESET A after the reception process at symbol #2, starts the detection process for the CORESET B after the reception process at symbol #1, and starts the detection process for the CORESET C after the reception process at symbol #0. In other words, the detection start timing in the terminal 200 is different with respect to each CORESET.

In action example 2-1, the base station 100 sets the number of detections for each CORESET to the maximum number of detections Y per symbol at the final symbol in which each CORESET is arranged, for example. As described above, in FIG. 12, the CORESETs A, B, and C with different numbers of symbols are allocated to the terminal 200, and the final symbol of each CORESET is different. Thus, the base station 100 may set Y times as the number of detections in the search space (that is, the maximum number of detections per symbol) for each CORESET.

Specifically, the base station 100 sets Y times as the number of detections for the CORESET C at symbol #0, sets Y times as the number of detections for the CORESET B at symbol #1, and sets Y times as the number of detections for the CORESET A at symbol #2. In other words, the base station 100 may allocate as many times as possible (Y times for each) for each CORESET from the maximum numbers of detections (3Y times) at symbols #0 to #2, in which the CORESETs A, B, and C illustrated in FIG. 12 are respectively arranged. In other words, in FIG. 12, with respect to the CORESETs with different numbers of symbols, the maximum number of detections (Y times) for each symbol does not have to be distributed among the CORESETs.

Further, the base station 100 sets the number in the search space for each aggregation level with respect to each CORESET (not illustrated).

Then, the base station 100 notifies the terminal 200 of the number of detections in the search space for each CORESET and each aggregation level by using the signaling of the upper layer.

For example, as illustrated in FIG. 13A, FIG. 13B, and FIG. 13C, in a case where the CORESETs A, B, and C with different numbers of symbols are set for the terminal 200 (for example, see FIG. 12), the number of detections for each aggregation level may be notified such that the maximum number of detections for each symbol (Y times) is not exceeded at the final symbol in which each CORESET is arranged.

In FIG. 13A, FIG. 13B, and FIG. 13C, the maximum number of detections Y for each symbol is set to 16 times. As illustrated in FIG. 13A, FIG. 13B, and FIG. 13C, for each CORESET, 16 times as the number of detections are allocated to a different symbol. Note that in a case where the number of detections for each CORESET is individually notified, the number of detections for each aggregation level may be different depending on each CORESET.

Further, in a case where plural CORESETs with the same symbol length are allocated to the terminal 200, the base station 100 may respectively allocate the numbers of detections for the plural CORESETs such that the maximum number of detections for each symbol (Y times) is not exceeded.

FIG. 14A and FIG. 14B illustrate allocation examples of the numbers of detections in a case where the two CORESETs (a CORESET D and a CORESET E) whose number of symbols is one are allocated to the terminal 200. In FIG. 14A and FIG. 14B, the maximum number of detections per symbol is set to 16. The total of the numbers of detections for the CORESET D is 6 times as illustrated in FIG. 14A, the total of the numbers of detections for the CORESET E is 10 as illustrated in FIG. 14B, and the total of the numbers of detections at symbol #0 is 16 times. Note that as for the number of detections in the search space for plural CORESETs with the same number of symbols, the number of detections may be different for each CORESET as FIG. 14A and FIG. 14B or may be an equivalent value (same value) among the CORESETs.

In such a manner, in action example 2-1, the base station 100 sets the number of detections for each CORESET such that the maximum number of detections does not exceed the maximum value per symbol among the CORESETs with the same symbol length. Accordingly, the number of detections in the search space does not have to be shared among the CORESETs with different numbers of symbols. Thus, the CORESETs with different numbers of symbols are allocated to the terminal 200, the number of detections in the search space for the terminal 200 is thereby increased, and the collision probability between the pieces of UE in the search space may be reduced.

Note that in a case where the number of symbols of the CORESET is long, it is possible that the NR-PDCCH candidate does not use all the symbols in the CORESET but uses a portion of the symbols in a low aggregation level. In this case, the base station 100 may count the number of detections for the NR-PDCCH candidate not at the final symbol of the CORESET but at the final symbol in which the NR-PDCCH candidate is arranged. That is, the base station 100 may count the number of detections at each of plural symbols in the CORESET.

Action Example 2-2: Frequency First Mapping

In the frequency first mapping, as illustrated in FIG. 11B, it is assumed that one CCE is arranged in one symbol. Thus, the NR-PDCCH candidates in the CORESET are arranged in one symbol or plural symbols in the CORESET.

Consequently, in the frequency first mapping, the base station 100 counts the number of detections in the search space about the NR-PDCCH candidate at the final symbol in the symbols in which each NR-PDCCH candidate in each CORESET is arranged. Further, the base station 100 sets the number of detections in the search space for each NR-PDCCH candidate for the terminal 200 in the range in which the counted number of detections does not exceed the maximum value for each symbol.

Figure 15:
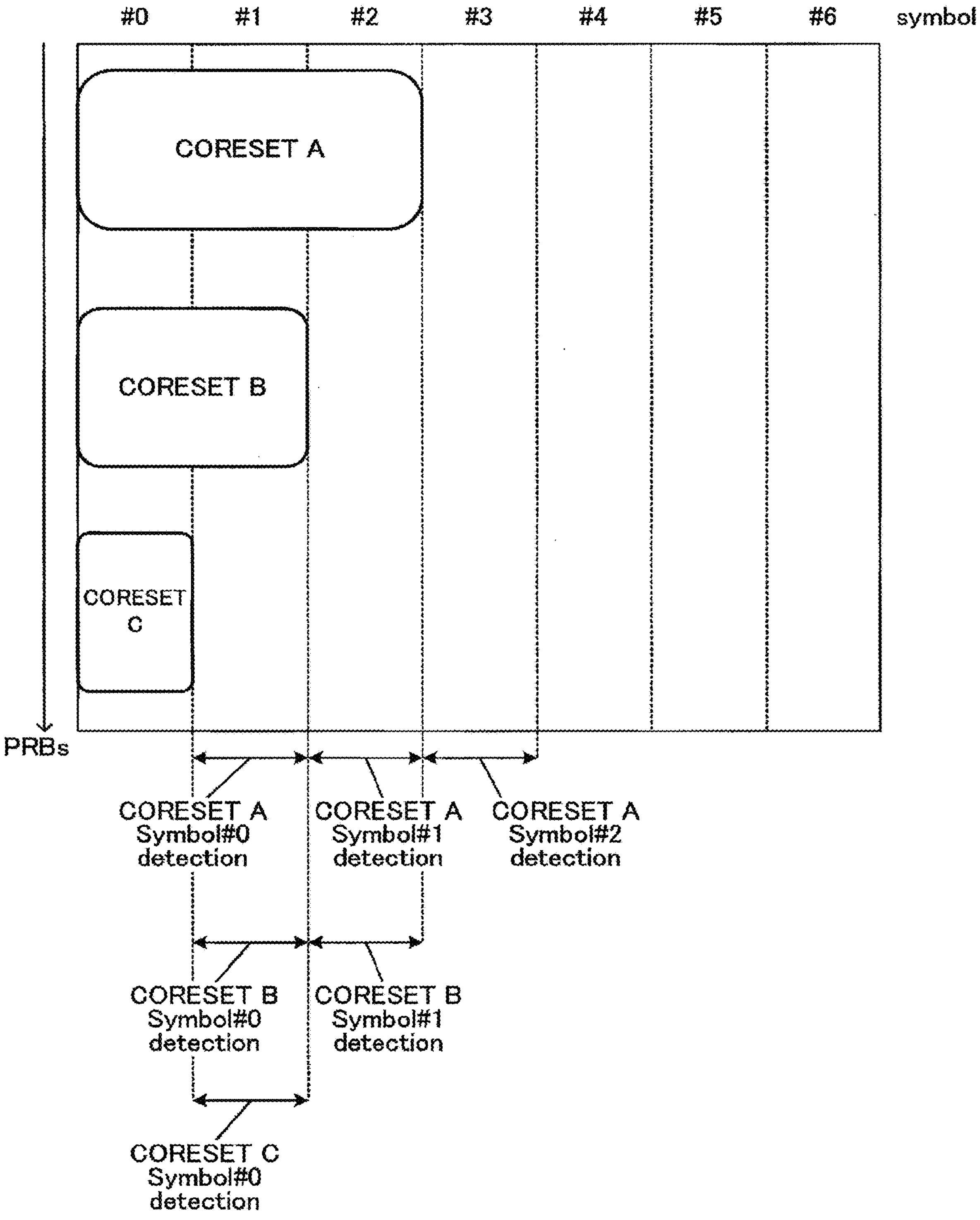
FIG. 15 illustrates an arrangement example of CORESETs allocated to the terminal according to action example 2-2 of the second embodiment.

FIG. 15 illustrates an example where in action example 2-2, a CORESET A whose number of symbols is three (symbols #0 to #2), a CORESET B whose number of symbols is two (symbols #0 and #1), and a CORESET C whose number of symbols is one (symbol #0) are allocated to the terminal 200. Further, in FIG. 15, the maximum number of detections per symbol is set to Y times.

In FIG. 15, the terminal 200 starts detection for each NR-PDCCH candidate after the reception process of the final symbol, in which the NR-PDCCH candidate is arranged, in each CORESET. Consequently, depending on the arrangement of the NR-PDCCH in the CORESET, the terminal 200 may start the detection process without waiting for reception of the final symbol in which the CORESET is arranged.

For example, it is assumed that the CORESET A illustrated in FIG. 15, whose number of symbols is three, includes the NR-PDCCH candidates that are arranged in only symbol #0, the NR-PDCCH candidates that are arranged in symbols #0 and #1 or only symbol #1 (the NR-PDCCH candidates whose final symbol is symbol #1), and the NR-PDCCH candidates that are arranged in symbols #0, #1, and #2 or only symbol #2 (the NR-PDCCH candidates whose final symbol is symbol #2). Similarly, it is assumed that the CORESET B illustrated in FIG. 15, whose number of symbols is two, includes the NR-PDCCH candidates that are arranged in only symbol #0 and the NR-PDCCH candidates that are arranged in symbols #0 and #1 or only symbol #1 (the NR-PDCCH candidates whose final symbol is symbol #1). Further, it is assumed that the CORESET C illustrated in FIG. 15, whose number of symbols is one, includes the NR-PDCCH candidates that are arranged in only symbol #0.

In this case, the terminal 200 starts detection at the time point when each NR-PDCCH candidate is received at each symbol.

Thus, in action example 2-2, in a case where plural CORESETs with different numbers of symbols are allocated to the terminal 200, the number of detections may be allocated to the NR-PDCCH candidates of each CORESET until the maximum number of detections per symbol (Y times) is reached in each symbol in which each CORESET is arranged. For example, in FIG. 15, the base station 100 respectively sets, with respect to symbol #0, the numbers of detections for the NR-PDCCH candidates whose final symbol is symbol #0 in the CORESETs A, B, and C such that the maximum number of detections (Y times) is not exceeded. Similarly, the base station 100 respectively sets, with respect to symbol #1, the numbers of detections for the NR-PDCCH candidates whose final symbol is symbol #1 in the CORESETs A and B such that the maximum number of detections (Y times) is not exceeded. Further, the base station 100 sets, with respect to symbol #2, the number of detections for the NR-PDCCH candidates whose final symbol is symbol #2 in the CORESET A such that the maximum number of detections (Y times) is not exceeded.

The base station 100 notifies the terminal 200 of the number of detections in the search space for each CORESET, each symbol, and each aggregation level by using the signaling of the upper layer.

For example, as illustrated in FIG. 16, in a case where the CORESETs A, B, and C with different numbers of symbols are set for the terminal 200 (for example, see FIG. 15), the number of detections for each aggregation level may be notified such that the maximum number of detections for each symbol (Y times) is not exceeded at each symbol in which each CORESET is arranged. Note that in FIG. 16, the maximum number of detections Y for each symbol is set to 16 times. As one example, in symbol #0 illustrated in FIG. 16, the number of detections for the NR-PDCCH candidates for the CORESET A (the total of the number of detections in each aggregation level) is set to five times, the number of detections for the NR-PDCCH candidates for the CORESET B (the total of the number of detections in each aggregation level) is set to five times, and the number of detections for the NR-PDCCH candidates for the CORESET C (the total of the number of detections in each aggregation level) is set to six times. The same applies to the other symbols.

Further, in the frequency first mapping, the NR-PDCCH candidates that are detected at symbol #1 are arranged in symbols #0 and #1 or only symbol #1. Consequently, the numbers of detections may be set while the numbers of symbols in which the NR-PDCCH candidates are arranged are distinguished, and the numbers of detections may be notified in the upper layer.

FIG. 17 illustrates an example where the numbers of detections are set while the numbers of symbols in which the NR-PDCCH candidates are arranged are distinguished. In FIG. 17, in the aggregation levels of two or higher (AL2), the numbers of detections are respectively set while a case where the NR-PDCCH candidates are arranged in only one symbol is distinguished from a case where the NR-PDCCH candidates are arranged in plural symbols.

In such a manner, the base station 100 may use the NR-PDCCH candidates in different manners such as allocating a signal by using the NR-PDCCH candidate spread over plural symbols in a case where power boosting is requested and allocating a signal by using the NR-PDCCH candidate arranged in only one symbol in a case where time multiplexing with other UE is desired, for example.

Further, in the frequency first mapping, as illustrated in FIG. 18, the numbers of detections for the NR-PDCCH candidates with respect to aggregation levels in each symbol in which detection is performed may be set equivalently. In such a manner, overhead for the signaling of the upper layer may be decreased.

In the above, action example 2-1 and action example 2-2 are described.

In such a manner, in this embodiment, when the base station 100 sets the number of detections for the CORESETs set for the terminal 200, the base station 100 counts the number of detections for each NR-PDCCH candidate at the final symbol of each NR-PDCCH candidates in the search space. Further, the maximum number of detections per component carrier (cell) is set for each symbol. Further, the base station 100 sets the number of detections for each symbol in the range in which the maximum number of detections for each symbol is not exceeded.

Accordingly, because the numbers of detections are separately counted among the CORESETs (NR-PDCCH candidates) with different final symbols in which the CORESETs are arranged, the total of the numbers of detections in the search space for the terminal 200 may be increased. Accordingly, the collision probability between the pieces of UE in the search space may be reduced.

Further, in this embodiment, the base station 100 sets the number of detections for each CORESET and each aggregation level by the signaling of the upper layer (for example, the RRC signaling). Accordingly, detailed settings of the number of detections become possible for each terminal 200 and each aggregation level.

Note that in both of the frequency first mapping and the time first mapping, the number of detections for each CORESET may be counted at the final symbol of the CORESET. In such a manner, the base station 100 may separately set the numbers of detections for the CORESETs with different numbers of symbols, and setting of the number of detections may be simplified.

Further, the number of detections for each symbol may be set to the maximum number of detections or lower, and the total number of numbers of detections that are notified by the signaling of the upper layer may be lower than the maximum number of detections.

Further, as a setting method of the maximum number of detections (Y times), a method described in the first embodiment may be applied.

Further, here, as one example, a case is described where the aggregation levels (AL) are one, two, four, and eight. However, the value of the aggregation level is not limited to those, but a greater value than AL=8 may be used, for example. Particularly, it is possible that the aggregation level is set while being limited to a value that is a power of two.

Further, here, a case is described where the number of detections is counted with respect to each symbol. However, the number of detections may be counted every two symbols or every Z symbols. A method of counting the number of detections every Z symbols is suitable for a case where the terminal 200 receives Z symbols and thereafter performs a process of starting detection of the search space, for example. Particularly, in a case where the subcarrier interval is wide and the symbol interval is short, the process may be simplified by performing such a process.

Further, in a case where on the time axis, a reference signal (demodulation reference signal (DMRS)) is used among the NR-PDCCH candidates in a sharing manner, the terminal 200 may not perform a demodulation process of the NR-PDCCH unless an estimation process by using the DMRS is completed. Thus, in a case where the DMRS which has to be referred to is present in a symbol in the rear of the final symbol of the symbols in which the NR-PDCCH is arranged, the base station 100 may count the number of detections for the NR-PDCCH in the position of the symbol of the DMRS. Note that whether or not the DMRS is used for the estimation process in a symbol in the rear of the NR-PDCCH may simultaneously be set with setting of the CORESET.

Further, the numbers of symbols of one, two, and three are discussed as the numbers of symbols of the CORESETs. However, as CORESET arrangement in the slot, the CORESET may be allocated to contiguous symbols. For example, in a case where the number of symbols of the CORESET is three, the CORESET is arranged in front symbols #0, #1, and #2 in the slot. Further, the number of symbols of the supported CORESET is different in accordance with the bandwidth. For example, when the bandwidth is narrower than X, the CORESET whose number of symbols is three or less (in other words, any of the numbers of symbols of one, two, and three) is supported. When the bandwidth is X or wider, the CORESET whose number of symbols is two or less (in other words, either one of the numbers of symbols of one and two) is supported.

Further, in addition to this, the numbers of symbols that are supported may be limited depending on the configuration of the slot. For example, in a 14-symbol slot, one, two, and three as the numbers of symbols of the CORESETs may be supported, and in a 7-symbol slot, one and two as the numbers of symbols of the CORESETs may be supported. In such a manner, the number of symbols of the CORESET becomes long in the 7-symbol slot whose number of symbols is small, and the number of symbols in which the PDSCH and a PUSCH are arrangeable may thereby be inhibited from becoming short.

Further, discussion is made about a case where the DMRS used for demodulation of the PDSCH is arranged in a fixed symbol regardless of the length (number of symbols) of the CORESET. In this case, the arrangement position of the DMRS may be determined based on the longest number of CORESET symbols that is defined by the bandwidth and the slot configuration (14 symbols or 7 symbols). For example, in a case where the longest number of CORESET symbols is three, the DMRS for the PDSCH may be arranged in the fourth symbol. In a case where the longest number of CORESET symbols is two, the DMRS for the PDSCH may be arranged in the third symbol. In such a manner, regardless of the symbol length of the CORESET that is actually allocated, the position of the DMRS for the PDSCH may fixedly be set to the front symbol in the symbols that do not overlap with the symbols of the CORESET. The DMRS is arranged on a front side in the slot, the terminal 200 may thereby finish channel estimation early, and benefit is provided in which the start time of a decoding process of the PDSCH may be made early.

Third Embodiment

A base station and a terminal according to this embodiment have basic configurations common to the base station 100 and the terminal 200 according to the first embodiment and will thus be described making reference to FIG. 3 and FIG. 4.

In this embodiment, the base station 100 and the terminal 200 determine the number of detections in the search space for the terminal 200 with respect to each aggregation level based on information shared between the base station 100 and the terminal 200 and provided calculation formulas. In such a manner, the number of pieces of RRC signaling may be decreased compared to the second embodiment.

Note that in the following, it is assumed that the maximum value Y per component carrier (cell) of the number of detections in the search space is in advance defined similarly to the second embodiment. Further, the maximum value Y may be determined by a similar method to the first embodiment.

In the following, specific action examples according to this embodiment will be described.

Action Example 3-1

In action example 3-1, in a case where plural CORESETs are allocated to the terminal 200, in distribution of the number of detections in the search space among the CORESETs, a higher number of detections is allocated to the CORESET whose number of REGs and number of CCEs included in the CORESET are larger. Here, the number of REGs and number of CCEs represent largeness of the size of the CORESET.

For example, in a case where the number of detections in the search space (for example, the maximum number of detections) is distributed among plural CORESETs with the same number of symbols, the base station 100 and the terminal 200 equivalently distribute the numbers of detections in a case where the number of REGs and number of CCEs included in each CORESET are the same but distribute higher numbers of detections to the CORESETs in larger sizes in a case where the numbers of REGs and numbers of CCEs are different. Accordingly, in the resources in which the CORESET in a larger size is arranged, the collision probability between the pieces of UE in the search space may be reduced.

The method of action example 3-1 is suitable particularly for the time first mapping. In the time first mapping, the terminal 200 is considered to start detection for all the NR-PDCCH candidates after the reception process of the final symbol of the CORESET. Consequently, in action example 3-1, it is effective to allocate a higher number of detections such that the collision probability between the pieces of UE in the search space becomes lower as the size of the CORESET is larger.

Further, the base station 100 and the terminal 200 may allocate a higher number of detections to the CORESET whose number of PRBs which configure the CORESET is larger. In such a manner, a high number of detections may be allocated to the CORESET in which the number of PRBs per symbol is large. This method is suitable particularly for the frequency first mapping in which detection of the search space is performed for each symbol.

For example, two CORESETs (CORESET #0 and CORESET #1) are allocated to the terminal 200, and the sizes (the number of REGs per CORESET) are respectively set as N0 and N1. Further, the maximum number of detections in the search space per symbol is set to Y times. In this case, the number of detections allocated to CORESET #0 is obtained by $Y*N0/(N0+N1)$, and the number of detections allocated to CORESET #1 is obtained by $Y*N1/(N0+N1)$. For example, following these formulas, the base station 100 and the terminal 200 may equivalently distribute the number of detections (Y/2 times) to each CORESET in a case where the sizes of the two CORESETs are equivalent.

Further, in a case where the CORESET for a UE specific search space, the CORESET for a common search space, and the CORESET for a group common search space are arranged in the same symbols and the number of detections is distributed, the base station 100 and the terminal 200 first respectively secure the numbers of detections for the CORESET for the common search space and the CORESET for the group common search space (in other words, the numbers of detections for CORESETs for common search spaces). Then, after securing the numbers of detections in the common search spaces, the base station 100 and the terminal 200 distribute the number of detections for the CORESET for the UE specific search space. In such a manner, the numbers of detections in the common search space and the group common search space by which important information is possibly transmitted may preferentially be secured.

Note that the CORESET for the common search space may be identified by information included in the PBCH. Further, the CORESET for the group common search space may be identified from information included in an SIB or may be identified by notification of settings by the SIB. Further, it is assumed that both of the common search space and the group common search space are set before the UE specific search space is set.

For example, two CORESETs (CORESET #0 and CORESET #1) for the UE specific search space are allocated to the terminal 200, and the sizes (here, the number of REGs per CORESET) are respectively set as N0 and N1. Further, the maximum number of detections is set as Y. Further, the number of detections allocated to the CORESET for the common search space is set as Nc. In this case, the number of detections allocated to CORESET #0 is obtained by $(Y-Nc)*N0/(N0+N1)$, and the number of detections allocated to CORESET #1 is obtained by $(Y-Nc)*N1/(N0+N1)$.

Action Example 3-2

In action example 3-2, distribution of the number of detections in the search space for each aggregation level in one CORESET is determined in accordance with one or plural conditions in the following.

(1) In a case where the number of REGs and number of CCEs per CORESET are large or a case where the number of PRBs per CORESET is large, high numbers of detections are set for the NR-PDCCH candidates in high aggregation levels compared to a case where the number of REGs and number of CCEs per CORESET are small or a case where the number of PRBs per CORESET is small.

Accordingly, in a case where the number of REGs and number of CCEs per CORESET are large or a case where the number of PRBs per CORESET is large, many NR-PDCCH candidate positions (numbers of detections) are provided, and the collision probability between the pieces of UE in the search space may thus be reduced. Consequently, in a case where the number of REGs and number of CCEs per CORESET are large or a case where the number of PRBs per CORESET is large, the probability that the search space for the other UE is occupied may become low even if a high aggregation level is used.

Further, the case where the number of REGs and number of CCEs per CORESET are large or the case where the number of PRBs per CORESET is large is suitable for arrangement in a high aggregation level compared to the case where the number of REGs and number of CCEs per CORESET are small.

(2) The used aggregation level is made variable in accordance with the band. Specifically, the aggregation level is made low in a low band, and the aggregation level is made high in a high band.

There is a characteristic that in a high band, attenuation of electric waves is large and the coverage of the cell becomes small. Consequently, in order to widen the coverage, use of a high aggregation level is desired. Particularly, the width of aggregation level that is supported may be made different between the lower band than 6 GHZ (below 6 GHZ) and the higher band than 6 GHZ (above 6 GHz).

(3) The used aggregation level is made variable in accordance with the subcarrier interval. Specifically, the aggregation level is made low for a narrow subcarrier interval, and the aggregation level is made high for a wide subcarrier interval.

It is assumed that a wide subcarrier interval is used for a high frequency band. Thus, in a case where the coverage of the cell becomes small in a high frequency band, it is effective to expand the coverage by using a high aggregation level.

(4) The used aggregation level is set in accordance with the UE capability or category.

The UE capability or category is performance of the UE that is provided by the maximum transport block size which may be transmitted and received by the UE, the size of a soft buffer, the number of supported layers of spatial multiplexing, and so forth. It is possible that the UE with higher performance may improve the line quality by effects and so forth of antenna diversity. Consequently, it is effective to allocate a lower aggregation level to the UE with higher performance and to allocate a higher aggregation level to the UE with lower performance.

Further, the base station 100 may set the aggregation level based on the performance of the UE about the PRB process, the demodulation process, and the decoding process of polar codes or the like as the UE capability or category. Here, the PRB process is a series of processes in which extraction of a desired PRB to be the NR-PDCCH candidate, the channel estimation process, the channel equalization process based on request, and so forth are conducted with respect to the reception signal. The UE whose executable frequency per unit time of the PRB process or the demodulation process is higher may be considered to be the UE with higher performance. It is possible that the UE with higher performance may improve the line quality by effects and so forth of antenna diversity. Consequently, it is effective to allocate a lower aggregation level to the UE whose executable frequency per unit time of the PRB process or the demodulation process is higher and to allocate a higher aggregation level to the UE whose executable frequency per unit time of the PRB process or the demodulation process is lower.

(5) The used aggregation level is set in accordance with the service category.

The service categories are eMBB, URLLC, mMTC, and so forth. Because URLLC is strict about latency, the error rate desired for the DCI is higher than the other service categories. Consequently, in URLLC, a high aggregation level compared to eMBB may be used. Further, mMTC is possibly arranged in a place where the line quality is inadequate. In such a case, the reception quality may be enhanced by using a high aggregation level.

In the above, action example 3-1 and action example 3-2 are described.

In such a manner, in this embodiment, the base station 100 and the terminal 200 determine the number of detections in the search space set for the terminal 200 with respect to each aggregation level in accordance with the shared information and the provided calculation formulas. Accordingly, as for setting of the search space, the signaling (for example, the RRC signaling) amount from the base station 100 to the terminal 200 may be reduced.

In the foregoing, the embodiments of the present disclosure are described.

Note that in the above embodiments, a case is described where the number of detections in the search space is set for each component carrier. However, the number of detections in the search space may be common to all component carriers or may be different for each component carrier.

Further, in the above embodiments, as for a frequency region (PRB #), physical mapping is described as one example. However, logical mapping may also be applied. In a case of logical mapping, change is performed from logical mapping to physical mapping. Thus, because the frequency region that is contiguous in logical mapping is arranged in physically separate positions, frequency diversity effects may be obtained.

Further, the control resource set (CORESET) may also be referred to as search space or PDCCH PRB set.

Further, it is possible that plural CORESETs are allocated to the UE. Further, in the above embodiments, a case is described where the head symbol of the CORESET is symbol #0 (the head symbol of the slot) as one example. However, the CORESET may be arranged from a rear symbol of the slot.

Further the signaling of the upper layer may be replaced by MAC signaling. In a case of the MAC signaling, the rate of changes of cases set for the UE may be raised compared to the RRC signaling.

Further, the DMRS may be a reference signal with a different name.

The present disclosure can be realized by software, hardware, or software in cooperation with hardware. Each functional block used in the description of each embodiment described above can be partly or entirely realized by an LSI such as an integrated circuit, and each process described in each embodiment described above may be controlled partly or entirely by the same LSI or a combination of LSIs. The LSI may be individually formed as chips, or one chip may be formed so as to include a part or all of the functional blocks. The LSI may include data input and output. The LSI here may be referred to as an IC, a system LSI, a super LSI, or an ultra LSI depending on a difference in the degree of integration. The technique of implementing an integrated circuit is not limited to the LSI and may be realized by using a dedicated circuit, a general-purpose processor, or a special-purpose processor. Further, a field programmable gate array (FPGA) that can be programmed after the manufacture of the LSI or a reconfigurable processor in which the connections and the settings of circuit cells disposed inside the LSI can be reconfigured may be used. The present disclosure can be realized as digital processing or analogue processing. In addition, if integrated circuit technology replaces LSIs as a result of the advancement of semiconductor technology or other derivative technology, the functional blocks may be integrated using such technology. Biotechnology can also be applied.

A base station of the present disclosure includes: a circuit that sets at least one search space which includes plural control channel candidates to be targets of detection of a control signal in a terminal; and a transmitter that transmits the control signal which is mapped on any of the plural control channel candidates in the search space. The number of detections in the search space by the terminal is determined based on settings of the terminal.

In the base station of the present disclosure, the number of detections in the search space is determined based on a configuration of time resources in which the control channel candidates are arranged.

In the base station of the present disclosure, a parameter that indicates the configuration of the time resources is the number of symbols that configure a slot or time per symbol.

In the base station of the present disclosure, the number of detections in the search space is determined based on a subcarrier interval that is set for the terminal.

In the base station of the present disclosure, the number of detections in the search space is determined based on a service category that is set for the terminal or a category of the terminal.

A base station of the present disclosure includes: a circuit that sets at least one search space which includes plural control channel candidates to be targets of detection of a control signal in a terminal; and a transmitter that transmits the control signal which is mapped on any of the plural control channel candidates in the search space. A maximum value of the number of detections in the search space by the terminal is set for each symbol in which the plural control channel candidates are arranged. The circuit sets the number of detections for each of the plural control channel candidates within the maximum value at a final symbol in symbols in which the control channel candidate is arranged.

In the base station of the present disclosure, the number of detections for each aggregation level of the at least one search space is notified to the terminal by signaling of an upper layer.

In the base station of the present disclosure, the number of detections for each aggregation level of the at least one search space is determined based on information that is shared between the base station and the terminal.

A terminal of the present disclosure includes: a receiver that receives a signal; and a circuit that detects at least one search space which includes plural control channel candidates to be targets of detection of a control signal in the terminal and identifies the control signal which is addressed to the own terminal from the signal. The number of detections in the search space by the terminal is determined based on settings of the terminal.

A terminal of the present disclosure includes: a receiver that receives a signal; and a circuit that detects at least one search space which includes plural control channel candidates to be targets of detection of a control signal in the terminal and identifies the control signal which is addressed to the own terminal from the signal. A maximum value of the number of detections in the search space by the terminal is set for each symbol in which the plural control channel candidates are arranged. The number of detections for each of the plural control channel candidates is set within the maximum value at a final symbol in symbols in which the control channel candidate is arranged.

A communication method of the present disclosure includes: setting at least one search space that includes plural control channel candidates to be targets of detection of a control signal in a terminal; and transmitting the control signal that is mapped on any of the plural control channel candidates in the search space. The number of detections in the search space by the terminal is determined based on settings of the terminal.

A communication method of the present disclosure includes: setting at least one search space that includes plural control channel candidates to be targets of detection of a control signal in a terminal; and transmitting the control signal that is mapped on any of the plural control channel candidates in the search space. A maximum value of the number of detections in the search space by the terminal is set for each symbol in which the plural control channel candidates are arranged. The number of detections for each of the plural control channel candidates is set within the maximum value at a final symbol in symbols in which the control channel candidate is arranged.

A communication method of the present disclosure includes: receiving a signal; and detecting at least one search space that includes plural control channel candidates to be targets of detection of a control signal in the terminal to identify the control signal that is addressed to the own terminal from the signal. The number of detections in the search space by the terminal is determined based on settings of the terminal.

A communication method of the present disclosure includes: receiving a signal; and detecting at least one search space that includes plural control channel candidates to be targets of detection of a control signal in the terminal to identify the control signal that is addressed to the terminal from the signal. A maximum value of the number of detections in the search space by the terminal is set for each symbol in which the plural control channel candidates are arranged. The number of detections for each of the plural control channel candidates is set within the maximum value at a final symbol in symbols in which the control channel candidate is arranged.

INDUSTRIAL APPLICABILITY

One embodiment of the present disclosure is useful for mobile communication systems.

REFERENCE SIGNS LIST

100 base station
101 CORESET setting unit
102, 207 setting unit for setting the number of detections
103 CORESET setting information generation unit
104 DCI generation unit
105, 208 error correction coding unit
106, 209 modulation unit
107, 210 signal allocation unit
108, 211 transmission unit
109, 201 reception unit
110, 202 signal separation unit
111, 204 demodulation unit
112, 205 error correction decoding unit
200 terminal
203 DCI reception unit
206 CORESET setting information reception unit

The invention claimed is:

1. A user equipment (UE) comprising:

a receiver, which, in operation, receives a signal, and circuitry, which, in operation, monitors a plurality of physical downlink control channel (PDCCH) candidates of a search space in the signal, wherein a maximum number of the PDCCH candidates monitored is set based on a subcarrier interval, the maximum number of PDCCH candidates monitored being stepwise reduced as the subcarrier interval becomes wider, and wherein the maximum number of the PDCCH candidates monitored is set every two or determined number of symbols, and a number of the PDCCH candidates monitored is counted every two or determined number of symbols.

2. The user equipment according to claim 1, wherein a number of the PDCCH candidates monitored is set differently for each aggregation level.

3. The user equipment according to claim 1, wherein a number of the PDCCH candidates monitored is indicated to the UE by upper layer signaling.

4. The user equipment according to claim 1, wherein the maximum number of the PDCCH candidates monitored decreases as a processing time of the UE for a physical downlink shared channel (PDSCH) scheduled by a PDCCH in the search space decreases.

5. The user equipment according to claim 1, wherein the maximum number of the PDCCH candidates monitored is set at least every two symbols, and a number of the PDCCH candidates monitored is counted every at least two symbols.

6. The user equipment according to claim 1, wherein the maximum number of PDCCH candidates monitored is set per absolute time of the search space and is stepwise reduced as a processing time of a physical downlink control channel (PDSCH) allocated by downlink control information (DCI) in the search space becomes shorter.

7. The user equipment according to claim 6, wherein the maximum number of PDCCH candidates monitored of the search space is less than a proportional value calculated by an absolute time of the search space estimated based on a proportional relationship between the subcarrier interval and the number of PDCCH candidates monitored when the subcarrier interval becomes more than 15 kHz.

8. The user equipment according to claim 1, wherein a first subcarrier interval is one-quarter a second subcarrier interval, and a first maximum number of the PDCCH candidates monitored with the first subcarrier interval is less than four times a second maximum number of the PDCCH candidates monitored with the second subcarrier interval.

9. A communication method for a user equipment (UE), the method comprising:

receiving a signal, and monitoring a plurality of physical downlink control channel (PDCCH) candidates of a search space in the signal, wherein a maximum number of the PDCCH candidates monitored is set based on a subcarrier interval, the maximum number of the PDCCH candidates monitored being stepwise reduced as the subcarrier interval becomes wider, and wherein the maximum number of the PDCCH candidates monitored is set every two or determined number of symbols, and a number of the PDCCH candidates monitored is counted every two or determined number of symbols.

* * * * *